US009528209B2

(12) United States Patent
Takaoka

(10) Patent No.: US 9,528,209 B2
(45) Date of Patent: Dec. 27, 2016

(54) THREE-DIMENSIONAL NET-SHAPED STRUCTURE AND METHOD AND APPARATUS FOR MANUFACTURING THEREOF

(71) Applicant: C-ENG CO., LTD., Gamagori-Shi, Aichi-Ken (JP)

(72) Inventor: Nobuyuki Takaoka, Gamagori (JP)

(73) Assignee: C-ENG CO., LTD., Gamagori-Shi (JP)

( * ) Notice: Subject to any disclaimer, the term of this patent is extended or adjusted under 35 U.S.C. 154(b) by 475 days.

(21) Appl. No.: 13/791,954

(22) Filed: Mar. 9, 2013

(65) Prior Publication Data

US 2013/0189472 A1    Jul. 25, 2013

Related U.S. Application Data

(63) Continuation-in-part of application No. PCT/JP2012/003290, filed on May 18, 2012.

(30) Foreign Application Priority Data

May 18, 2011    (JP) .................................. 2011-111620

(51) Int. Cl.
  *B29C 43/34*    (2006.01)
  *D04H 3/16*    (2006.01)
  (Continued)

(52) U.S. Cl.
  CPC ............. *D04H 3/163* (2013.01); *B29C 47/005* (2013.01); *B29C 47/0047* (2013.01);
  (Continued)

(58) Field of Classification Search
  CPC ................. D04H 3/163; B29C 47/8895; B29C 2043/3433; B29C 47/0047; B29C 47/005; B29C 47/0064
  (Continued)

(56) References Cited

U.S. PATENT DOCUMENTS 3,936,337 A * 2/1976 Stapp ..................... D04H 3/007
  156/167
4,952,265 A * 8/1990 Yamanaka et al. ........... 156/167
(Continued)

FOREIGN PATENT DOCUMENTS

IN    201001228 I4 * 11/2010
JP    1-207462 A    8/1989
(Continued)

*Primary Examiner* — Atul P. Khare
(74) *Attorney, Agent, or Firm* — Matthias Scholl, PC; Matthias Scholl

(57) ABSTRACT

A manufacturing apparatus of three-dimensional net-like structure includes: a nozzle with a plurality of extrusion holes that are arrayed to extrude and drop downward a thermoplastic synthetic resin in a molten state and thereby form a filament assembly of a plurality of filaments; a pair of chutes arranged across longitudinal faces of the filament assembly to have inclined surfaces that are sloped toward the filament assembly and opposed to each other across a distance that is less than a short side length of the array of the extrusion holes; water supply ports arranged to supply cooling water to the inclined surfaces; and a pair of haul-off machines configured to have endless belts arranged to be in contact with the longitudinal faces of the filament assembly and haul off the filament assembly and opposed to each other across a less distance than the distance between the pair of chutes.

4 Claims, 22 Drawing Sheets

(51) Int. Cl.
*D01D 10/00* (2006.01)
*B29C 47/00* (2006.01)
*B29C 47/88* (2006.01)
*D04H 3/03* (2012.01)
*D04H 3/07* (2012.01)

(52) U.S. Cl.
CPC ...... *B29C 47/0064* (2013.01); *B29C 47/8895* (2013.01); *D01D 10/00* (2013.01); *D04H 3/03* (2013.01); *D04H 3/07* (2013.01); *D04H 3/16* (2013.01); *B29C 2043/3433* (2013.01)

(58) Field of Classification Search
USPC ....... 264/178 F, 211.13, 211.14, 284; 425/71
See application file for complete search history.

(56) References Cited

U.S. PATENT DOCUMENTS

| | | | |
|---|---|---|---|
| 5,639,543 A * | 6/1997 | Isoda et al. | 428/220 |
| 7,377,762 B2 * | 5/2008 | Nishibori et al. | 425/71 |
| 7,625,629 B2 * | 12/2009 | Takaoka | 428/220 |
| 7,993,734 B2 * | 8/2011 | Takaoka | 428/218 |
| 8,226,882 B2 * | 7/2012 | Takaoka | 264/622 |
| 8,277,210 B2 * | 10/2012 | Takaoka | 425/71 |
| 8,568,635 B2 * | 10/2013 | Takaoka | 264/171.2 |
| 8,757,996 B2 * | 6/2014 | Takaoka | 425/71 |
| 2009/0269571 A1 * | 10/2009 | Takaoka | 428/222 |
| 2011/0316185 A1 * | 12/2011 | Takaoka | B29C 43/22 264/112 |
| 2012/0042452 A1 * | 2/2012 | Takaoka | 5/691 |
| 2013/0161858 A1 * | 6/2013 | Sasaki | D04H 3/03 264/167 |
| 2014/0035191 A1 * | 2/2014 | Takaoka | 264/210.8 |

FOREIGN PATENT DOCUMENTS

| | | | | |
|---|---|---|---|---|
| JP | 2001-328153 A | | 11/2001 | |
| JP | 2006097223 A | * | 4/2006 | |
| JP | 2010-279687 A | | 12/2010 | |
| JP | WO 2012035736 A1 | * | 3/2012 | ............... D04H 3/03 |
| WO | 01/68967 A1 | | 9/2001 | |
| WO | 2004/063450 A1 | | 7/2004 | |

\* cited by examiner

THREE-DIMENSIONAL NET-SHAPED STRUCTURE AND METHOD AND APPARATUS FOR MANUFACTURING THEREOF

CROSS-REFERENCE TO RELATED APPLICATIONS

This application is a continuation-in-part of International Patent Application No. PCT/JP2012/003290 with an international filing date of May 18, 2012, designating the United States, now pending, and further claims priority benefits to Japanese Patent Application No. 2011-111620, filed on May 18, 2011. The contents of all of the aforementioned applications, including any intervening amendments thereto, are incorporated herein by reference. Inquiries from the public to applicants or assignees concerning this document should be directed to: Matthias Scholl P. C., Attn.: Dr. Matthias Scholl Esq., 14781 Memorial Drive, Suite 1319, Houston, Tex. 77079.

BACKGROUND OF THE INVENTION

Field of the Invention

The present invention relates to a three-dimensional net-like structure used for mattresses and cushions, as well as to a manufacturing method of three-dimensional net-like structure and a manufacturing apparatus of three-dimensional net-like structure.

Description of the Related Art

The conventional method of forming four faces of a three-dimensional net-like structure described in PTL1 extrudes downward filaments of a thermoplastic synthetic resin as the material or the primary material in a molten state from a die with a nozzle end including a plurality of holes and thereby makes the filaments freely fall between partially submerged haul-off machines. The filaments are hauled off at a lower haul-off speed than the fall speed to form the three-dimensional net-like structure. This method uses two pairs of opposed haul-off machines to form a rectangular shape in a direction perpendicular to the extruding direction. The distance between the pair of opposed haul-off machines is set less than the width of the extruded filament assembly. All the four peripheral surfaces of the filament assembly come into contact with the haul-off machines to be formed in shape before or after the filament assembly is submerged. All the four peripheral surfaces of the resulting three-dimensional net-like structure parallel to the extruding direction accordingly have the higher density relative to the density of the remaining part other than the surfaces. This method enhances the alignment of the filaments without requiring any post finishing.

CITATION LIST

Patent Literature

PTL1: JP 2001-328153a

SUMMARY OF THE INVENTION

Technical Problem

With diversification of the demands for products which the three-dimensional net-like structure is applied, the finer adjustment of the repulsion and the dimensional accuracy is required. The method described in PTL1 does not achieve easy adjustment of the repulsion or dimensional accuracy. For example, it is not easy to evenly smoothen the surface of the three-dimensional net-like structure, while keeping the flexibility of the three-dimensional net-like structure.

The object of the invention is accordingly to enable easy adjustment of repulsion and dimensional accuracy at low cost and to improve the surface smoothness of the resulting three-dimensional net-like structure. The object of the invention is also to enable stable manufacture of the three-dimensional net-like structure having the improved surface smoothness by reducing the supply of cooling water to the chutes and preventing the filaments from being stuck.

Solution to Problem

In order to solve at least part of the above problems, according to one aspect of the invention, there is provided a manufacturing apparatus of three-dimensional net-like structure, including: a nozzle arranged to have a plurality of extrusion holes arrayed in an approximately rectangular shape and configured to drop downward a thermoplastic synthetic resin in a molten state extruded from the extrusion holes and thereby form a filament assembly of a plurality of filaments; a pair of long chutes located below the nozzle, arranged across longitudinal faces of the filament assembly to have inclined surfaces that are respectively sloped downward toward the filament assembly, and opposed to each other across a distance that is equal to or less than a short side length of the array of the extrusion holes at lower ends of the inclined surfaces; a water supplier located above the long chutes to supply cooling water to the inclined surfaces; and a pair of haul-off machines located below the long chutes and opposed to each other across a less distance than the distance between the pair of long chutes to be in contact with the longitudinal faces of the filament assembly and convey the filament assembly in water, wherein the plurality of filaments are tangled at random and thermally adhere to one another at the tangles to form a three-dimensional net-like structure.

According to one preferable embodiment of the invention, the manufacturing apparatus of three-dimensional net-like structure may further include a pair of short chutes located below the nozzle, arranged across short-direction faces of the filament assembly to have inclined surfaces that are respectively sloped downward toward the filament assembly, and opposed to each other across a distance that is equal to or less than a long side length of the array of the extrusion holes at lower ends of the inclined surfaces.

According to another aspect of the invention, there is provided a manufacturing apparatus of three-dimensional net-like structure, including: a nozzle arranged to have a plurality of extrusion holes arrayed in an approximately rectangular shape and configured to drop downward a thermoplastic synthetic resin in a molten state extruded from the extrusion holes and thereby form a filament assembly of a plurality of filaments; a pair of long chutes located below the nozzle, arranged across longitudinal faces of the filament assembly to have inclined surfaces that are respectively sloped downward toward the filament assembly and partially submerged, and opposed to each other across a distance that is less than a short side length of the array of the extrusion holes at lower ends of the inclined surfaces; a water supplier located above the long chutes to supply cooling water to the inclined surfaces; and a pair of haul-off machines located below the long chutes and opposed to each other across a distance that is equal to the distance between the pair of long chutes to be in contact with the longitudinal faces of the filament assembly and convey the filament assembly in water, wherein the plurality of filaments are tangled at random and thermally adhere to one another at the tangles to form a three-dimensional net-like structure.

According to one preferable embodiment of the invention, the manufacturing apparatus of three-dimensional net-like structure may further include a pair of short chutes located below the nozzle, arranged across short-direction faces of the filament assembly to have inclined surfaces that are respectively sloped downward toward the filament assembly and partially submerged, and opposed to each other across a distance that is less than a long side length of the array of the extrusion holes at lower ends of the inclined surfaces.

According to another preferable embodiment of the invention, the three-dimensional net-like structure may be formed to have harder side portions of higher bulk density than bulk density of other portions at locations corresponding to the short-direction faces of the filament assembly by increasing number of the extrusion holes in areas proximate to both ends of the nozzle in a longitudinal direction to be greater than number of the extrusion holes in a remaining area, by increasing size of the extrusion holes in areas proximate to both ends of the nozzle in a longitudinal direction to be greater than size of the extrusion holes in a remaining area or by setting the long side length of the array of the extrusion holes of the nozzle to be greater than the distance between the pair of short chutes.

According to yet another preferable embodiment of the invention, the haul-off machines may be designed to have variable haul-off speed, and the haul-off speed of the haul-off machines may be temporarily decreased to form a harder center portion of higher bulk density in a haul-off direction in the three-dimensional net-like structure than bulk density of other portions formed at ordinary haul-off speed.

According to another aspect of the invention, there is provided a manufacturing method of three-dimensional net-like structure, including the steps of: (a) extruding and dropping downward a thermoplastic synthetic rein in a molten state from a nozzle arranged to have a plurality of extrusion holes arrayed in an approximately rectangular shape to form a filament assembly of a plurality of filaments; (b) supplying cooling water onto a pair of long chutes that are located below the nozzle, are arranged across longitudinal faces of the filament assembly to be inclined downward toward the filament assembly, and are opposed to each other across a distance that is equal to or less than a short side length of the array of the extrusion holes at inclined lower ends, (c) causing filaments located on the longitudinal faces of the filament assembly to be in contact with upper surfaces of the long chutes, so as to bend the filaments in substantial loops, tangle the adjacent filaments at random and make the filaments thermally adhere to one another; (d) cooling down the plurality of tangled filaments with the cooling water supplied to the upper surfaces of the long chutes; (e) forming the longitudinal faces of the filament assembly, while guiding the plurality of tangled filaments obliquely downward toward center of the filament assembly along the long chutes; and (f) compressing and shape-forming the filament assembly by a pair of haul-off machines that are located below the long chutes and are opposed to each other across a less distance than the distance between the pair of opposed long chutes to hold the longitudinal faces of the filament assembly therebetween, and hauling off the filament assembly at a lower haul-off speed than a fall speed of the filament assembly, so as to submerge the filament assembly and cool down and solidify the submerged filament assembly.

According to one preferable embodiment of the invention, step (b) may supply the cooling water onto a pair of short chutes that are located below the nozzle, are arranged across short-direction faces of the filament assembly to be inclined downward toward the filament assembly, and are opposed to each other across a distance that is equal to or less than a long side length of the array of the extrusion holes at inclined lower ends. Step (c) may cause filaments located on the short-direction faces of the filament assembly to be in contact with upper surfaces of the short chutes, so as to bend the filaments in substantial loops, tangle the adjacent filaments at random and make the filaments thermally adhere to one another. Step (d) may cool down the plurality of tangled filaments with the cooling water supplied to the upper surfaces of the short chutes. Step (e) may form the short-direction faces of the filament assembly, while guiding the plurality of tangled filaments obliquely downward toward center of the filament assembly along the short chutes.

According to another preferable embodiment of the invention, step (a) may form harder side portions of higher bulk density than bulk density of other portions at locations corresponding to the short-direction faces of the filament assembly by increasing supply of the filaments from part of the nozzle corresponding to the short-direction faces of the filament assembly to be more than supply of the filaments from a remaining part of the nozzle or by setting the long side length of the array of the extrusion holes to be greater than the distance between the short chutes.

According to yet another preferable embodiment of the invention, step (f) may temporarily decrease a haul-off speed of the haul-off machines and thereby form a harder center portion of higher bulk density in a haul-off direction in the three-dimensional net-like structure than bulk density of other portions formed at ordinary haul-off speed.

According to another aspect of the invention, there is provided a manufacturing method of three-dimensional net-like structure, including the steps of: (a) extruding and dropping downward a thermoplastic synthetic rein in a molten state from a nozzle arranged to have a plurality of extrusion holes arrayed in an approximately rectangular shape to form a filament assembly of a plurality of filaments; (b) supplying cooling water onto a pair of long chutes that are located below the nozzle, are arranged across longitudinal faces of the filament assembly to be inclined downward toward the filament assembly and partially submerged, and are opposed to each other across a distance that is less than a short side length of the array of the extrusion holes at inclined lower ends, (c) causing filaments located on the longitudinal faces of the filament assembly to be in contact with upper surfaces of the long chutes, so as to bend the filaments in substantial loops, tangle the adjacent filaments at random and make the filaments thermally adhere to one another; (d) cooling down the plurality of tangled filaments with the cooling water supplied to the upper surfaces of the long chutes; (e) forming the longitudinal faces of the filament assembly, while guiding the plurality of tangled filaments obliquely downward toward center of the filament assembly along the long chutes; and (f) compressing and shape-forming the filament assembly by a pair of haul-off machines that are located below the long chutes and are opposed to each other across a distance that is equal to the distance between the pair of opposed long chutes to hold the longitudinal faces of the filament assembly therebetween, and hauling off the filament assembly at a lower haul-off speed than a fall speed of the filament assembly, so as to submerge the filament assembly and cool down and solidify the submerged filament assembly.

According to one preferable embodiment of the invention, step (b) may supply the cooling water onto a pair of short chutes that are located below the nozzle, are arranged across short-direction faces of the filament assembly to be inclined downward toward the filament assembly and partially submerged, and are opposed to each other across a distance that is less than a long side length of the array of the extrusion holes at inclined lower ends. Step (c) may cause filaments located on the short-direction faces of the filament assembly to be in contact with upper surfaces of the short chutes, so as to bend the filaments in substantial loops, tangle the adjacent filaments at random and make the filaments thermally adhere to one another. Step (d) may cool down the plurality of tangled filaments with the cooling water supplied to the upper surfaces of the short chutes. Step (e) may form the short-direction faces of the filament assembly, while guiding the plurality of tangled filaments obliquely downward toward center of the filament assembly along the short chutes.

According to another preferable embodiment of the invention, step (a) may form harder side portions of higher bulk density than bulk density of other portions at locations corresponding to the short-direction faces of the filament assembly by increasing supply of the filaments from part of the nozzle corresponding to the short-direction faces of the filament assembly to be more than supply of the filaments from a remaining part of the nozzle or by setting the long side length of the array of the extrusion holes to be greater than the distance between the short chutes.

According to yet another preferable embodiment of the invention, step (f) may temporarily decrease a haul-off speed of the haul-off machines and thereby form a harder center portion of higher bulk density in a haul-off direction in the three-dimensional net-like structure than bulk density of other portions formed at ordinary haul-off speed.

According to another aspect of the invention, there is provided a three-dimensional net-like structure manufactured by the manufacturing apparatus of three-dimensional net-like structure described above.

According to yet another aspect of the invention, there is provided a three-dimensional net-like structure manufactured by the manufacturing method of three-dimensional net-like structure described above.

The approximately rectangular shape of the nozzle array may not be a strictly rectangular shape but may have one or a plurality of curved sides. For example, when the three-dimensional net-like structure of the invention is applied for a mattress, the short sides of the approximately rectangular shape forming the side faces of the mattress may not be linear but may be arbitrarily curved. When the three-dimensional net-like structure of the invention is applied for a pillow, the approximately rectangular shape may be changed to any desired shape. The terms of "longitudinal direction" or "long side" and "short direction" or "short side" of the filament assembly and the nozzle are used only in a relative sense and do not specify the relationship in an absolute manner. The haul-off machines can thus be installed in any desired direction.

The pair of chutes are arranged to have the inclined surfaces for guiding the peripheral side faces of the falling filament assembly toward the center. The inclined surface may be a slope plane or may be a curved surface with varying percent of slope. In the embodiment where pairs of chutes are arranged respectively in the longitudinal direction and in the short direction of the filament assembly, the respective inclined surfaces may be provided separately or may be provided integrally to be continuous at four corners perpendicular to one another.

The haul-off machines have rotating bodies that are in contact with the longitudinal faces of the filament assembly. These rotating bodies haul off the filament assembly by their rotations, while holding the filament assembly therebetween. Endless belts are preferably used as the rotating bodies. This is, however, not restrictive, and rollers and other equivalent elements may be used as the rotating bodies.

In the aspect of the invention where the distance between the pair of opposed haul-off machines is less than the distance between the pair of opposed chutes, the distance between the pair of opposed haul-off machines is set less than the distance between the pair of opposed chutes preferably by 1 to 30%, more preferably by 3 to 27% and most preferably by 7 to 25%.

In the aspect of the invention where the distance between the pair of opposed chutes is equal to the distance between the pair of opposed haul-off machines, it is required to partially submerge the inclined surfaces of the pair of chutes. The water level expressed by the distance from the lower ends of the inclined surfaces is preferably at the height of 2 to 45 mm, more preferably at the height of 3 to 30 mm and most preferably at the height of 5 to 22 mm.

In the aspect of the invention where the distance between the pair of opposed chutes is equal to the distance between the pair of opposed haul-off machines, the distance between the pair of opposed chutes is set less than the long side length of the nozzle array preferably by 6 to 25%, more preferably by 3 to 10% and most preferably by 4 to 7%.

According to another aspect of the invention, there is provided a manufacturing apparatus of three-dimensional net-like structure, including: a nozzle arranged to have a plurality of extrusion holes arrayed in an approximately rectangular shape and configured to drop downward a thermoplastic synthetic resin in a molten state extruded from the extrusion holes and thereby form a filament assembly of a plurality of filaments; a pair of long chutes located below the nozzle, arranged across longitudinal faces of the filament assembly to have inclined surfaces that are respectively sloped downward toward the filament assembly, and opposed to each other across a distance that is equal to or less than a short side length of the array of the extrusion holes at lower ends of the inclined surfaces; a water supplier located above the long chutes to supply cooling water to the inclined surfaces; water permeable sheets arranged to cover over upper surfaces of the long chutes; fixation elements arranged to fix the water permeable sheets at upper ends and lower ends of the long chutes; and haul-off machines located below the long chutes and opposed to each other to be in contact with the longitudinal faces of the filament assembly and convey the filament assembly in water, wherein the plurality of filaments are tangled at random and thermally adhere to one another at the tangles to form a three-dimensional net-like structure.

According to one preferable embodiment of the invention, the water supplier may be located above the water permeable sheets to make the cooling water spread over and flow on upper surfaces of the water permeable sheets.

According to another preferable embodiment of the invention, the water supplier may be located above the long chutes but below the water permeable sheets to supply the cooling water between the upper surfaces of the long chutes and the water permeable sheets to form a lower layer of cooling water. The cooling water may permeate through to upper surfaces of the water permeable sheets to form an upper layer of cooling water.

According to yet another preferable embodiment of the invention, the long chutes may be arranged to cover over side faces of the falling filament assembly, so as to enable the cooling water to be supplied over the upper surfaces of the long chutes.

According to another aspect of the invention, there is provided a manufacturing method of three-dimensional net-like structure, including the steps of: (a) extruding and dropping downward a thermoplastic synthetic rein in a molten state from a nozzle arranged to have a plurality of extrusion holes arrayed in an approximately rectangular shape to form a filament assembly of a plurality of filaments; (b) supplying cooling water onto a pair of long chutes that are located below the nozzle and opposed to each other across longitudinal faces of the filament assembly to be inclined downward toward the filament assembly, and onto water permeable sheets that are located above upper surfaces of the long chutes and are fixed at upper ends and lower ends; (c) causing filaments located on the longitudinal faces of the filament assembly to be in contact with upper surfaces of the long chutes, so as to bend the filaments in substantial loops, tangle the adjacent filaments at random and make the filaments thermally adhere to one another; (d) cooling down the plurality of tangled filaments with the cooling water supplied to the upper surfaces of the long chutes and the water permeable sheets; (e) forming the longitudinal faces of the filament assembly, while guiding the plurality of tangled filaments obliquely downward toward center of the filament assembly along the long chutes; and (f) compressing and shape-forming the filament assembly by a pair of haul-off machines that are located below the long chutes and are opposed to each other across the longitudinal faces of the filament assembly, and hauling off the filament assembly at a lower haul-off speed than a fall speed of the filament assembly, so as to submerge the filament assembly and cool down and solidify the submerged filament assembly.

The water permeable sheets are flexible members having water permeability, and preferable examples are cloths like cotton or polyester and metal meshes. These are, however, not restrictive, but any material having the water permeability and the flexibility to attain the similar functions and mechanisms may be used for the water permeable sheets.

Advantageous Effects of Invention

According to one aspect of the invention, the distance between the pair of opposed haul-off machines is set equal to or less than the distance between the pair of opposed long chutes. The opposed haul-off machines additionally apply compression, while the peripheral surfaces of the filament assembly are formed in shape by coming into contact with the long chutes. This enables the inside part of the filament assembly to be subjected to compression molding. This gives the three-dimensional net-like structure having the improved repulsion and the improved dimensional accuracy, which is not obtainable by the conventional method. This also gives the three-dimensional net-like structure having the uniformly smoothened surface.

In the aspect of the invention where the distance between the pair of opposed haul-off machines is equal to the distance between the pair of opposed long chutes, the lower ends of the long chutes are submerged to enable the filament assembly to be hauled off by the haul-off machines, while achieving the similar features and advantageous effects to those described above.

According to one aspect of the invention, both the long chutes and the short chutes are used to simultaneously form the longitudinal faces and the short-direction faces of the filament assembly.

According to another aspect of the invention, the harder side portions or the harder center portion may be formed by the rational procedure to give the three-dimensional net-like structures that satisfy various demands of the product specification.

According to another aspect of the invention, fixation of the water permeable sheets to the long chutes advantageously equalize the flow of cooling water on the upper surfaces of the long chutes and thereby saves the water to an appropriate level. This also prevents poor formation of the filaments and thereby gives the three-dimensional net-like structure having the improved surface smoothness.

BRIEF DESCRIPTION OF DRAWINGS

FIGS. 15a and 15b are diagrams illustrating a chute 504 of the embodiment, wherein FIG. 15a is a plan view and FIG. 15b is a cross sectional view taken on a line D-D;

FIGS. 16a and 16b are diagrams illustrating advantageous effects of the chute 504 of the embodiment, wherein FIG. 16a illustrates the chute 504 according to the invention and FIG. 16b illustrates a chute without lower fixation elements 573a and 573b;

FIGS. 19a and 19b are diagrams illustrating advantageous effects of a chute 604 of the embodiment, wherein FIG. 19a illustrates the chute 604 according to the invention and FIG. 19b illustrates a chute without lower fixation elements 673a and 673b;

FIGS. 20a and 20b are diagrams illustrating a chute 704 according to yet another embodiment of the invention, wherein FIG. 20a is a plan view and FIG. 20b is a cross sectional view taken on a line E-E;

DETAILED DESCRIPTION OF THE EMBODIMENTS

A manufacturing apparatus 1 of three-dimensional net-like structure according to embodiment 1 of the invention is described below with reference to FIGS. 1 to 7.

Figure 1:
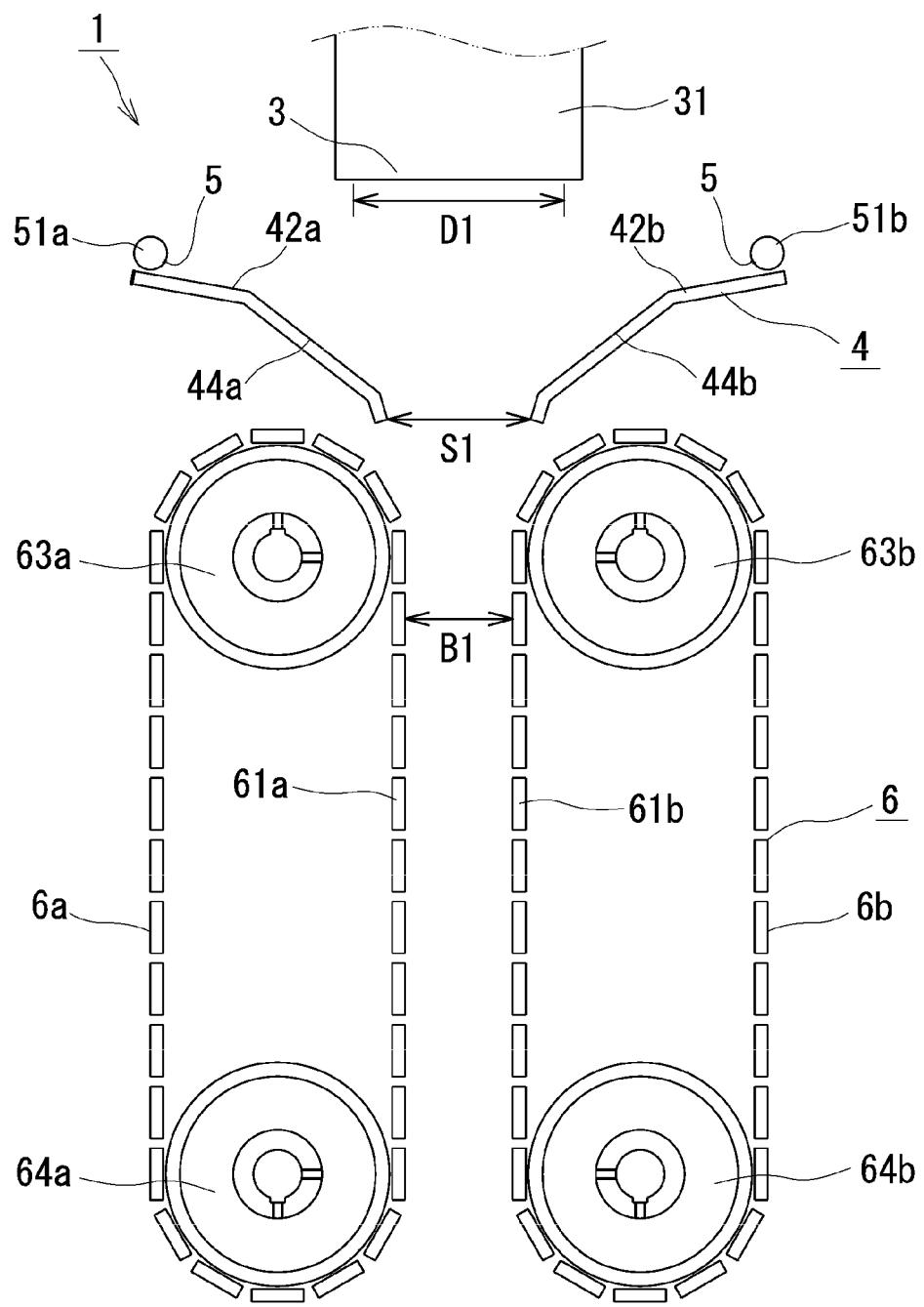
FIG. 1 is a diagram illustrating a side face of a manufacturing apparatus 1 of three-dimensional net-like structure according to embodiment 1 of the invention.
Figure 3:
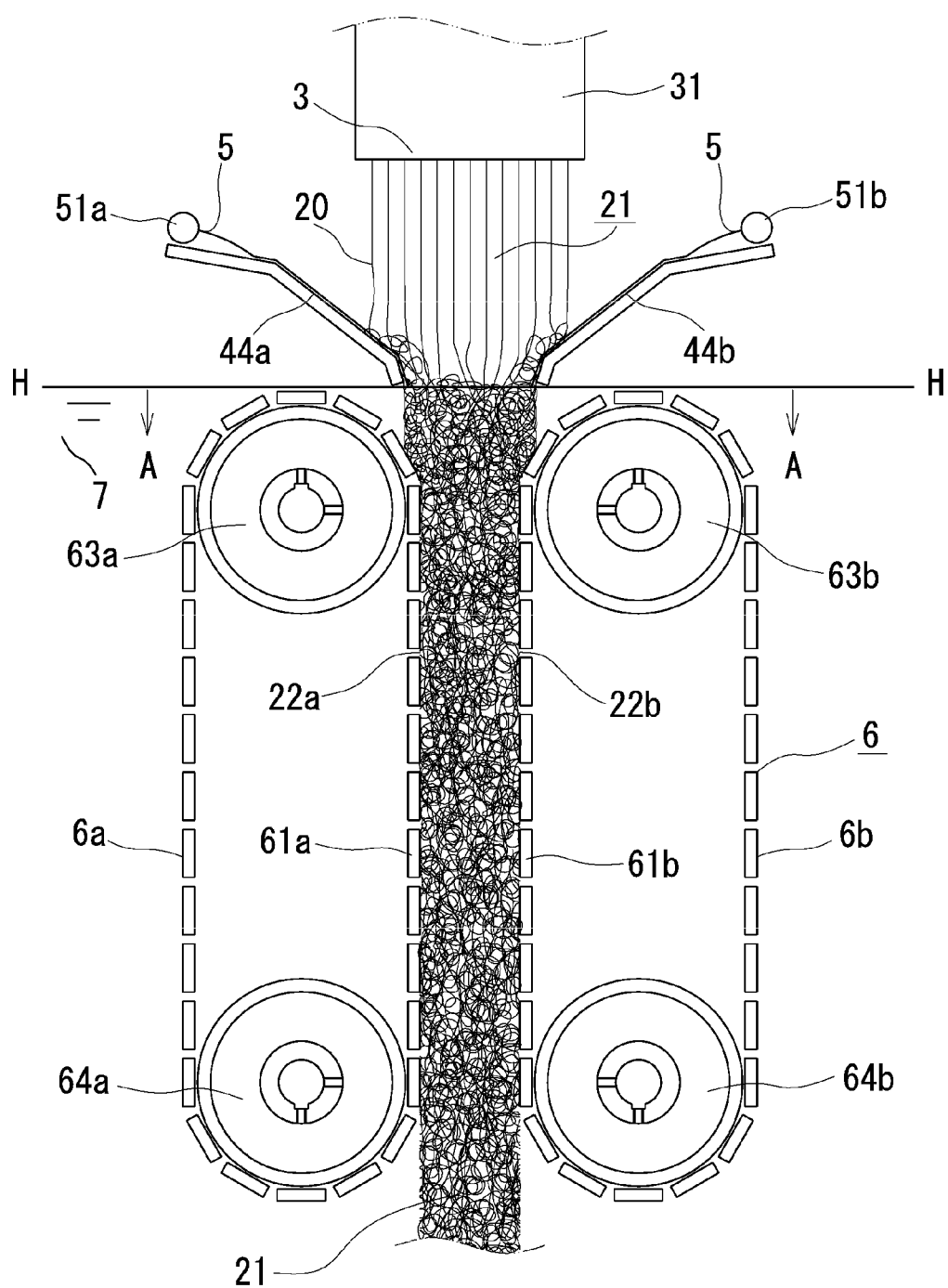
FIG. 3 is a diagram illustrating the manufacturing apparatus 1 of three-dimensional net-like structure according to embodiment 1 in use.

As shown in FIGS. 1 and 3, the manufacturing apparatus 1 of three-dimensional net-like structure is provided as an apparatus for manufacturing a three-dimensional net-like structure 10 formed from filaments 20 of a thermoplastic synthetic resin tangled in loops at random and thermally adhering to one another at the tangles. The manufacturing apparatus 1 of three-dimensional net-like structure includes a nozzle 3, a chute 4 located below the nozzle 3, water supply ports 5 located above the chute 4 as ends of a water supplier, and haul-off machines 6 located below the chute 4. The respective components are described below.

Figure 2:
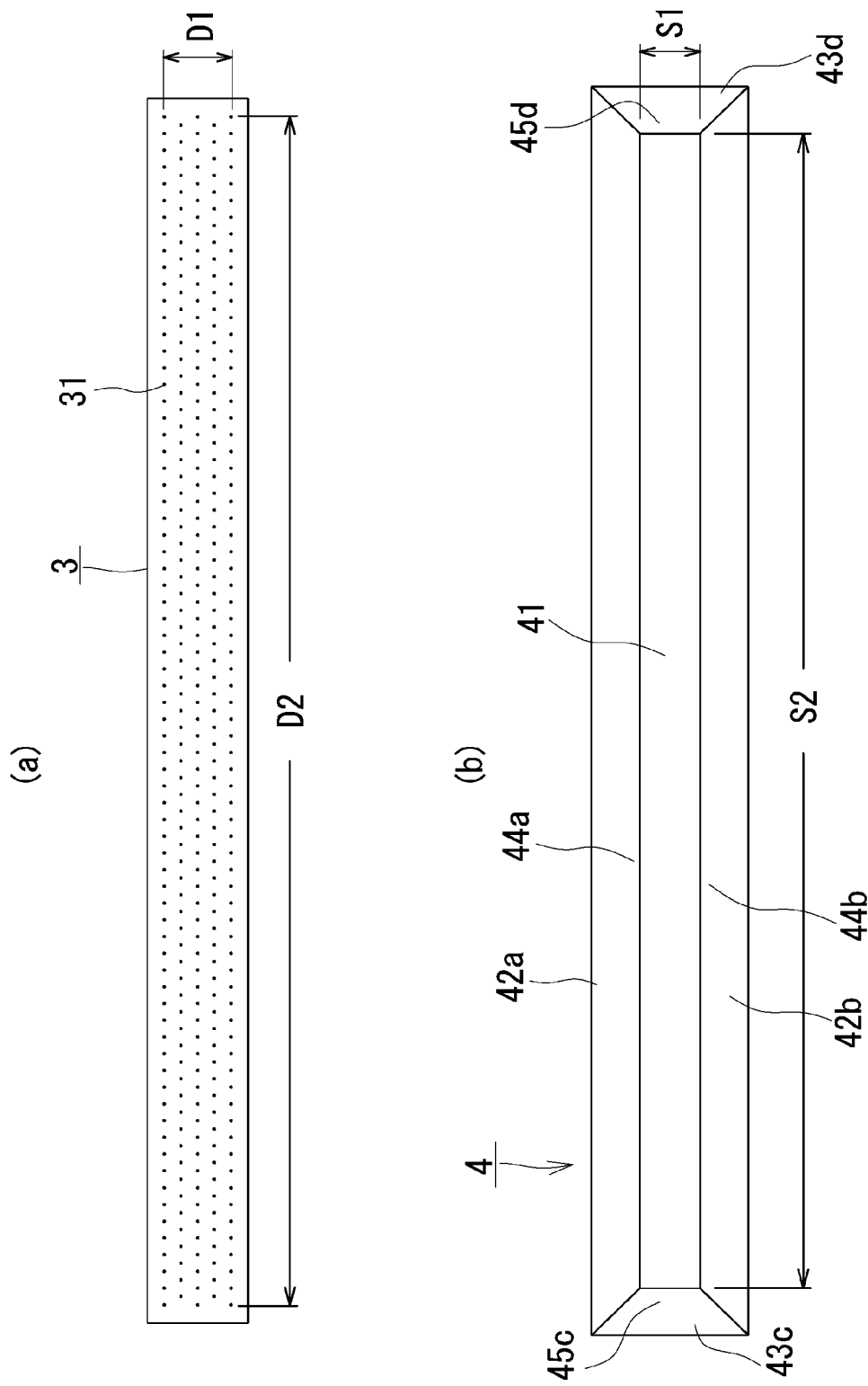
FIG. 2a is a bottom view illustrating a nozzle 3 having an array of extrusion holes 31 according to embodiment 1.
FIG. 2b is a plan view illustrating a chute 4 according to embodiment 1.
Figure 5:
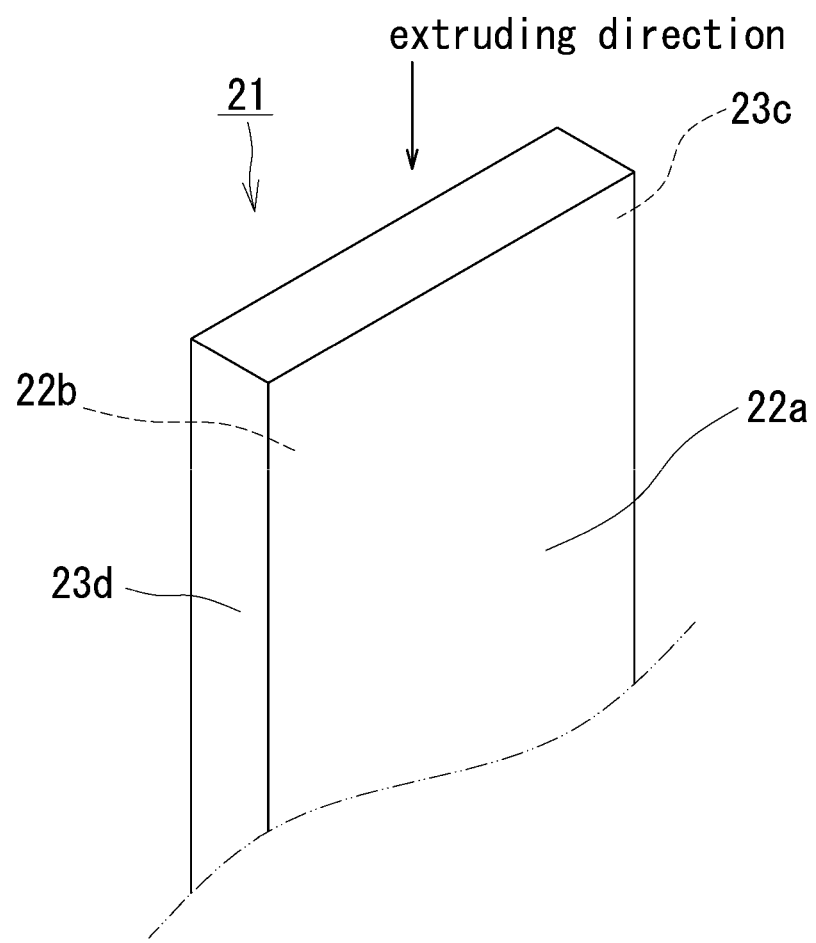
FIG. 5 is a perspective view illustrating a filament assembly 21 in the process of manufacturing the three-dimensional net-like structure according to embodiment 1.
Figure 6:
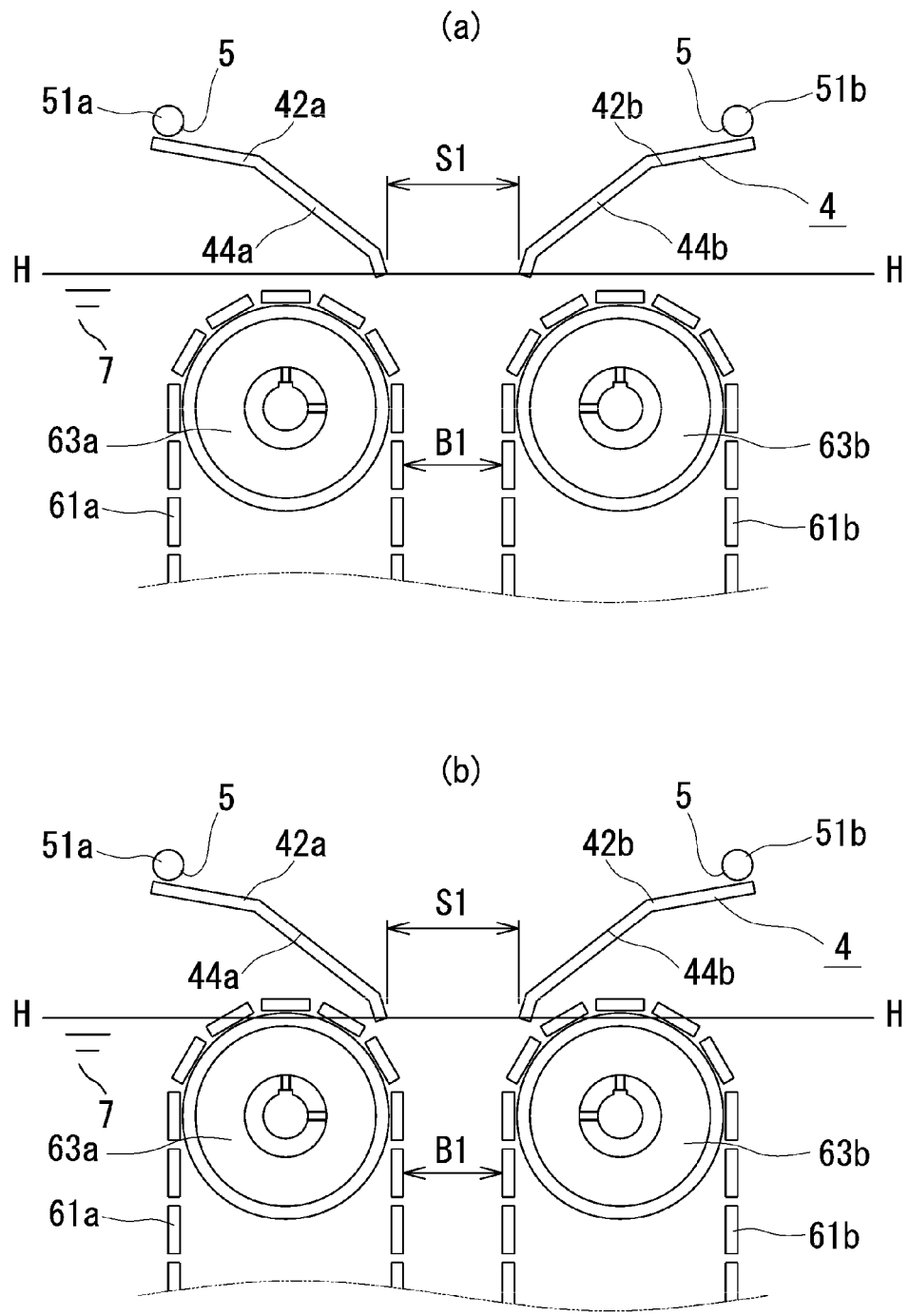
FIGS. 6a and 6b are diagrams showing changes in water level H by adjusting the installation height of the chute 4 according to embodiment 1.

As shown in FIGS. 1 to 3, the nozzle 3 is arranged to have a plurality of extrusion holes 31 arrayed in an approximately rectangular shape and is integrally formed as a lower portion of a die (not shown) provided to temporarily hold molten thermoplastic synthetic resin under pressure. Extrusion of the filaments 20 out of the respective extrusion holes 31 causes a filament assembly 21 having a cross section in a fall direction corresponding to the shape of the array of the extrusion holes 31 of the nozzle 3 to be ejected and fall down (FIG. 3). The falling filament assembly 21 has longitudinal faces 22a and 22b and short-direction faces 23c and 23d on its periphery (FIG. 5). The plurality of extrusion holes 31 are arranged in an approximately rectangular shape of D1×D2 in lengths of respective sides as shown in FIG. 2a. The approximately rectangular shape of the array may not be a strictly rectangular shape. For example, when the three-dimensional net-like structure 10 is applied for a bed mattress, the extrusion holes 31 may be arranged in curved surfaces in the thickness direction of the mattress.

As shown in FIGS. 1, 2b and 3, the chute 4 is located below the nozzle 3 and includes a pair of long chutes 42a and 42b arranged to be opposed to each other across the longitudinal faces 22a and 22b of the falling filament assembly 21 and a pair of short chutes 43c and 43d arranged to be opposed to each other across the short-direction faces 23c and 23d of the filament assembly 21 to form a shape-forming opening 41 on its lower end. The long chute 42a and the long chute 42b opposed to each other respectively have an inclined surface 44a and an inclined surface 44b downwardly inclined toward the filament assembly 21. Similarly the short chute 43c and the short chute 43d opposed to each other respectively have an inclined surface 45c and an inclined surface 45d downwardly inclined toward the filament assembly 21.

As shown in FIGS. 1 and 2, a distance S1 between the respective lower ends of the inclined surface 44a and the inclined surface 44b is smaller than the short side length D1 in the array of the extrusion holes 31, whereas a distance S2 between the respective lower ends of the inclined surface 45c and the inclined surface 45d is smaller than the long side length D2 in the array of the extrusion holes 31. The space of S1×S2 defined by the lower sides of the inclined surfaces 44a and 44b and the inclined surfaces 45c and 45d defines the shape-forming opening 41. The shape of the inclined surface is not limited to the shape shown in FIG. 1 but may be a single slope plane or a curved surface with varying percent of slope. The pair of long chutes 42a and 42b and the pair of short chutes 43c and 43d may be provided separately or may be provided integrally to be continuous at the four corners perpendicular to one another. The invention may be implemented without the pair of short chutes 43c and 43d. The invention may also be implemented when the distance S1 is set equal to the short side length D1, as described later in embodiment 2.

The water supply ports 5 are provided as respective ends of supply pipes 51a and 51b, which are located above the long chutes 42a and 42b and arranged along substantially the whole lengths of the respective long chutes 42a and 42b in the longitudinal direction, so as to supply cooling water to the inclined surfaces 44a and 44b (FIG. 1). The respective upstream ends of the supply pipes 51a and 51b are connected to a water supply source (not shown). The cooling water may be supplied to the short chutes 43c and 43d by regulating the water flows from the supply pipes 51a and 51b or may be supplied from separate supply pipes (not shown) similarly arranged above the short chutes 43c and 43d.

Figure 4:
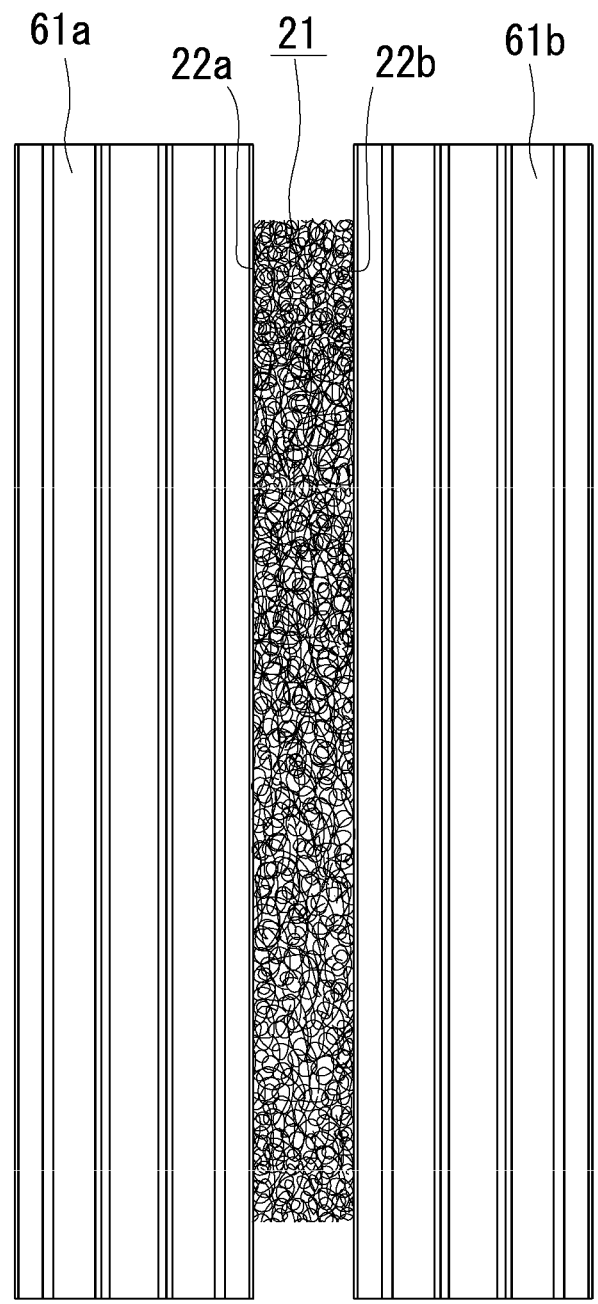
FIG. 4 is a cross sectional view taken on a line A-A of FIG. 3.

The haul-off machines 6 are provided as a pair of haul-off machines 6a and 6b. As shown in FIGS. 1, 3 and 4, the pair of haul-off machines 6a and 6b are located below the long chutes 42a and 42b to be opposed to each other and respectively include endless belts 61a and 61b arranged to be in contact with the longitudinal faces 22a and 22b of the filament assembly 21, pulleys 63a and 64a arranged to drive the endless belt 61a and pulleys 63b and 64b arranged to drive the endless belt 61b. Each of the haul-off machines 6a and 6b includes drive motors, chains and gears for driving the pulleys 63a and 64a or the pulleys 63b and 64b and has a drive controller (not shown) that includes a transmission for changing the rotation speed of the endless belt 61a or the endless belt 61b, a controller and various meters and gauges. A distance B1 between the pair of endless belts 61a and 61b is set less than the distance S1 between the respective lower ends of the inclined surfaces 44a and 44b (FIG. 1). The distance B1 is preferably set less than the distance S1 by 1 to 30%. The distance difference of less than 1% may have insufficient effects on improvement of repulsion of the product and stability of the thickness. The distance difference of greater than 30%, on the other hand, may cause the traces of the endless belts 61a and 61b to be left on the product or may excessively increase the load for driving the haul-off machines 6. The distance B1 is set less than the distance S1 preferably by 3 to 27% or more preferably by 7 to 25%. The pair of haul-off machines 6a and 6b are located inside a water tank 7. The haul-off machines 6 are structured, such that the distance B1 between the pair of endless belts 61a and 61b is freely changeable. The haul-off machines 6 are designed to pull and draw the filament assembly 21 by means of the endless belts, but may alternatively use rollers and other equivalents.

As shown in FIG. 3, the water tank 7 is used to make specific part of the manufacturing apparatus 1 of three-dimensional net-like structure submerged and cool down and solidify the filament assembly 21 in the molten state. It is preferable that water level H is not lower than the height of the lower ends of the inclined surfaces 44a and 44b of the chute 4 (FIG. 3). In other words, the water level H is set irrespective of the installation height of the chute 4 but on the basis of the lower ends of the inclined surfaces 44a and 44b as shown in FIGS. 6a and 6b. Part of the haul-off machines 6 may be exposed above the water level as shown in FIG. 6b. The water level is preferably set to the range of $0 \leq Wd \leq 45$ (mm), more preferably set to the range of $1 \leq Wd \leq 30$ (mm) and further more preferably set to the range of $3 \leq Wd \leq 22$ (mm), where Wd represents the height from the lower ends of the inclined surfaces 44a and 44b. The water level H may be equal to the height of the lower ends of the inclined surfaces 44a and 44b. The invention can be implemented at the water level of or above this height. It is, however, preferable to set the water level by taking into account the production tolerance of the water level and the levelness of the apparatus. Depending on the production conditions, setting the water level H to be higher than the lower ends of the inclined surfaces 44a and 44b by 3 mm or more generally prevents the water level H from being located below the lower ends of the inclined surfaces 44a and 44b. Depending on the production conditions, setting the water level H to be higher than the lower ends of the inclined surfaces 44a and 44b by 45 mm or more is, on the other hand, generally inadequate due to the start of solidification of the resin, the poor adhesion of the fibers and the increased surface roughness.

The following describes the manufacturing method of the three-dimensional net-like structure 10 according to embodiment 1 of the invention with reference to FIG. 3. The known structural parts are not specifically described here, and refer to Japanese Patent No. 4350286b and U.S. Pat. No. 7,625,629 for such structural parts.

The method first melts a material mixture containing thermoplastic synthetic resin as the main material. The molten material mixture is fed into a die (not shown), is pressurized and is extruded downward from the extrusion holes 31 of the nozzle 3 at the lower end of the die to form the filaments 20. The die may be set to the temperature of 100 to 400° C. and the throughput rate of 20 to 200 Kg/hour. The pressure may be added inside the die by the discharge pressure of, for example, a 75 mm screw and may be in the range of about 0.2 to 25 MPa. When the three-dimensional net-like structure 10 manufactured has the thickness of or over 100 mm, it is preferable to equalize the die pressure by using, for example, a gear pump. The array of the plurality of extrusion holes 31 causes the plurality of filaments 20 ejected out of the nozzle 3 to form the filament assembly 21.

The filaments 20 located on the longitudinal faces 22a and 22b of the periphery of the filament assembly 21 come into contact with the upper side of the inclined surfaces 44a and 44b of the pair of long chutes 42a and 42b. Such contact disturbs the vertical fall of the filaments 20 and causes the respective filaments 20 to be tangled with the adjacent filaments 20 in loops and slip down along the inclined surfaces 44a and 44b while being cooled down with the cooling water supplied through the supply pipes 51a and 51b. In this process, the filaments 20 directly receive the influence of the gravity and are tangled two-dimensionally along the inclined surfaces 44a and 44b. The water flows supplied through the supply pipes 51a and 51b also cover the inclined surfaces 45c and 45d of the pair of short chutes 43c and 43d. The filaments 20 located on the short-direction faces 23c and 23d of the periphery of the filament assembly 21 thus similarly slip down along the inclined surfaces 45c and 45d.

The filaments 20 of the filament assembly 21 falling without coming into contact with either the inclined surfaces 44a and 44b or the inclined surfaces 45c and 45d pass through the shape-forming opening 41. Among the filaments 20 passing through the shape-forming opening 41, those located near to the lower sides of the inclined surfaces 44a and 44b and the lower sides of the inclined surfaces 45c and 45d come into contact with the filaments 20 slipping down along the inclined surfaces 44a and 44b and the inclined surfaces 45c and 45d to be tangled in loops. The disturbance of the fall by such contact and tangling is propagated to a certain range of the adjacent filaments 20 in the radially central direction. Among the filaments 20 passing through the shape-forming opening 41, those located near to the center of the shape-forming opening 41 reach the water surface without such tangling. The haul-off speed by the haul-off machines 6 is less than the falling speed of the filament assembly 21. The respective filaments 20 reaching the water surface accordingly bend and are substantially tangled in loops in the vicinity of the water surface.

The filament assembly 21 formed in the three-dimensional net-like shape as described above is cooled down in the water tank 7 and is pulled and drawn down by the haul-off machines 6. The filament assembly 21 falling down to the location of the endless belts 61a and 61b is held in the distance B1 between the endless belts 61a and 62b, which is smaller than the distance S1 in the short direction of the shape-forming opening 41, to be compressed. At the time when the filament assembly 21 falls down to the location of the endless belts 61a and 61b, the filament assembly 21 is not completely submerged to be cooled down and solidified and can thus be compressed and formed in a predetermined shape by the endless belts 61a and 61b. The filament assembly 21 compressed to the three-dimensional net-like shape is then pulled and drawn by the haul-off machines 6 to be sufficiently cooled down and fixed in shape.

The filament assembly 21 formed in the three-dimensional net-like shape by the series of operations described above is cut into a desired length to give the three-dimensional net-like structure 10. The three-dimensional net-like structure 10 has the same cross sectional shape as that of the shape-forming opening 41 and is additionally compressed and formed in a substantially plate-like shape by the haul-off machines 6. In the application without the short chutes 43c and 43d, the short-direction faces 23c and 23d of the three-dimensional net-like structure 10 may be subjected to end face treatment when needed.

Available examples of the thermoplastic synthetic resin contained in the material of the three-dimensional net-like structure 10 of the invention include polyolefins such as polyethylene and polypropylene, polyesters such as polyethylene terephthalate, polyamides such as nylon 66, polyvinyl chloride, polystyrene, copolymers and elastomers containing any of these resins as the base, and mixtures containing any of these resins. The material may additionally include an antimicrobial agent. In the application of the three-dimensional net-like structure 10 to bed mattress, polyethylene is the suitable material. Addition of an antimicrobial agent, a non-combustible material and a flame retardant to the thermoplastic synthetic resin material provides the three-dimensional net-like structure 10 with the relevant functions.

Figure 7:
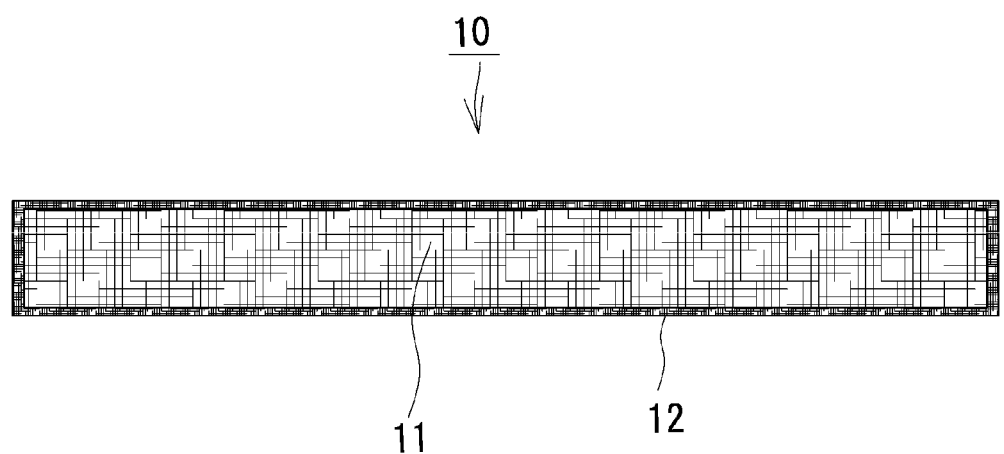
FIG. 7 is a diagram illustrating the cross section of a three-dimensional net-like structure 10 according to embodiment 1.

The following describes the three-dimensional net-like structure 10 manufactured according to embodiment 1 of the invention. The three-dimensional net-like structure 10 is formed from the plurality of filaments 20 tangled in loops at random and thermally adhering to one another. As shown in FIG. 7, a surface layer 12 having the greater bulk density than the bulk density of an inside part 11 is formed on side faces corresponding to the longitudinal faces 22a and 22b and the short-direction faces 23c and 23d of the periphery of the filament assembly 21 in the manufacturing process. The surface layer 12 is formed by tangling the filaments 20 two-dimensionally along the inclined surfaces 44a and 44b in the manufacturing process.

The three-dimensional net-like structure 10 may be adopted for, for example, bed mattresses, pillows and cushions. In the application to bed mattress, the three-dimensional net-like structure 10 may be adopted for the single size, the double size and other sizes of mattresses, for example, the size of 600 to 2000 mm in width and 1300 to 2500 mm in length. The three-dimensional net-like structure 10 is produced endless in the manufacturing process, so that a suitable length of the three-dimensional net-like structure 10 may be formed to rolled mattress. This is convenient for delivery and other purposes. The thickness of the three-dimensional net-like structure 10 is preferably 15 to 300 mm, more preferably 25 to 150 mm and further more preferably 30 to 80 mm.

Tables 1(a) and 1(b) show the results of one measurement test with varying the distance B1 between the endless belts 61a and 61b of the haul-off machines 6 relative to the distance S1 between the long chutes 42a and 42b of the chute 4. The measurement test measures the variation in repulsion of the three-dimensional net-like structure 10 and the stability of the thickness when the distance B1 between the haul-off machines 6 is changed relative to the distance S1 of the chute 4.

Table 1(a) shows the test results with respect to the distance B1 between the haul-off machines 6 set to 108 mm and Table 1(b) shows the test results with respect to the distance B1 between the haul-off machines 6 set to 100 mm, on the condition that the distance S1 of the chute 4 is fixed to 112 mm. The three-dimensional net-like structure 10 manufactured under the test conditions of Table 1(a) had the dimensions of 955 mm×1000 mm and the weight of 5.50 kg. The three-dimensional net-like structure 10 manufactured under the test conditions of Table 1(b) had the dimensions of 955 mm×1000 mm and the weight of 5.53 kg. The test measured the repulsion and the thickness at the left end, the center and the right end along the 955 mm-width direction of the three-dimensional net-like structure 10. This width direction corresponds to the longitudinal direction of the array of the extrusion holes 31 in the manufacturing process.

The measurement of the repulsion is described more specifically. Varying load was applied to the center of the mattress of the three-dimensional net-like structure 10 via a disc of 150 mm ϕ, and the forces applied to depress the mattress to 10 mm, 20 mm and 30 mm were measured as repulsive forces. The instruments used for such measurement were digital force gauge ZPS and load cell ZPS-DPU-1000N manufactured by Imada Co., Ltd.

According to the comparison between the test results of Table 1(a) and Table 1(b), setting the less distance B1 between the haul-off machines 6 provides the higher repulsion and the greater stability of the thickness in the width direction. The test results shown in both Tables 1(a) and 1(b) have the higher repulsive forces at the center, which are attributable to the specification of the equipment used for the measurement test.

Tables 2(a) and 2(b) and Tables 3(a) and 3(b) show the results of other measurement tests with varying the distance B1 between the endless belts 61a and 61b of the haul-off machines 6 relative to the distance S1 between the long chutes 42a and 42b of the chute 4. These measurement tests measure the variation in repulsion of the three-dimensional net-like structure 10 and the stability of the thickness when the distance B1 between the haul-off machines 6 is changed relative to the distance S1 of the chute 4 in the same manner as the measurement test of Table 1 but set the conditions to reduce the thickness of the three-dimensional net-like structure 10. In the same manner as the measurement test of Table 1, the test measured the repulsion and the thickness at the left end, the center and the right end along the 955 mm-width direction of the three-dimensional net-like structure 10. Accompanied with the reduction of the thickness of the mattress of the three-dimensional net-like structure 10, the forces applied to depress the mattress to 10 mm and 20 mm were measured as repulsive forces.

TABLE 1(a)

|  |  | Left end | Middle portion | Right end |
|---|---|---|---|---|
| Repulsive force (N) | 10 mm | 100 | 111 | 109 |
|  | 20 mm | 157 | 169 | 164 |
|  | 30 mm | 201 | 228 | 211 |
| Thickness (nm) |  | 105.8 | 107.0 | 105.2 |

TABLE 1(b)

|  |  | Left end | Middle portion | Right end |
|---|---|---|---|---|
| Repulsive force (N) | 10 mm | 117 | 130 | 126 |
|  | 20 mm | 185 | 211 | 191 |
|  | 30 mm | 248 | 271 | 261 |
| Thickness (nm) |  | 104.6 | 104.7 | 104.5 |

TABLE 2(a)

|  |  | Left end | Middle portion | Right end |
|---|---|---|---|---|
| Repulsive force (N) | 10 mm | 19 | 17 | 19 |
|  | 20 mm | 34 | 32 | 32 |
| Thickness (nm) |  | 38.2 | 37.9 | 37.3 |

TABLE 2(b)

|  |  | Left end | Middle portion | Right end |
|---|---|---|---|---|
| Repulsive force (N) | 10 mm | 21 | 20 | 20 |
|  | 20 mm | 37 | 36 | 36 |
| Thickness (nm) |  | 35.4 | 35.4 | 35.8 |

TABLE 3(a)

|  |  | Left end | Middle portion | Right end |
|---|---|---|---|---|
| Repulsive force (N) | 10 mm | 20 | 19 | 20 |
|  | 20 mm | 31 | 30 | 29 |
| Thickness (nm) |  | 47.7 | 47.2 | 46.5 |

TABLE 3(b)

|  |  | Left end | Middle portion | Right end |
|---|---|---|---|---|
| Repulsive force (N) | 10 mm | 22 | 21 | 21 |
|  | 20 mm | 33 | 32 | 32 |
| Thickness (nm) |  | 45.3 | 45.1 | 45.6 |

Table 2(a) shows the test results with respect to the distance B1 between the haul-off machines 6 set to 32 mm and Table 2(b) shows the test results with respect to the distance B1 between the haul-off machines 6 set to 27 mm, on the condition that the distance S1 of the chute 4 is fixed to 35 mm. According to the comparison between the test results of Table 2(a) and Table 2(b), setting the less distance B1 between the haul-off machines 6 provides the greater stability of the thickness and the higher repulsion.

Table 3(a) shows the test results with respect to the distance B1 between the haul-off machines 6 set to 42 mm and Table 3(b) shows the test results with respect to the distance B1 between the haul-off machines 6 set to 38 mm, on the condition that the distance S1 of the chute 4 is fixed to 45 mm. According to the comparison between the test results of Table 3(a) and Table 3(b), setting the less distance B1 between the haul-off machines 6 provides the greater stability of the thickness and the higher repulsion.

According to the results of the measurement tests shown in Tables 1 to 3, with respect to all the three-dimensional net-like structures 10 of the various thicknesses, reducing the distance B1 between the haul-off machines 6 relative to the distance S1 of the chute 4 provides the stability of the thickness of the resulting three-dimensional net-like structure 10 and the improved repulsion.

The following describes the advantageous effects of embodiment 1 of the invention. The manufacturing method of this embodiment applies compression to the filament assembly 21 by the opposed endless belts 61a and 61b of the haul-off machines 6, in addition to compression molding of the longitudinal faces 22a and 22b and the short-direction faces 23c and 23d as the peripheral surfaces of the filament assembly 21 passing through the shape-forming opening 41 of the chute 4. This enables the part inside the peripheral surfaces of the filament assembly 21 to be subjected to compression molding. The filament assembly 21 is formed in the three-dimensional net-like shape in the vicinity of the shape-forming opening 41 and the water surface of the water tank 7. The filament assembly 21 is, however, not solidified immediately after submerging. It takes some time to completely stabilize the three-dimensional net-like structure. The filament assembly 21 is further subjected to compression molding by the endless belts 61a and 61b, prior to the complete stabilization of the three-dimensional net-like structure.

Such features of the manufacturing method give the three-dimensional net-like structure 10 that is not obtainable by the conventional method using only the chute 4. Even the conventional method can control the bulk density, the thickness and the repulsion of the three-dimensional net-like structure 10 by adjusting the length of the array of the extrusion holes 31 and the size of the shape-forming opening 41 of the chute 4. The method of the invention additionally applies the compression by the endless belts 61a and 61b of the haul-off machines 6. With respect to the three-dimensional net-like structure 10 of the fixed thickness, the method of the invention improves the repulsion and the dimensional accuracy, compared with the conventional method (Tables 1 to 3). The method of the invention also enables the three-dimensional net-like structure 10 to have the uniformly smoothened surface. Additionally, the position of the endless belts 61a and 61b is freely adjustable. The product of the desired density and the desired strength can thus be manufactured by adjusting the shape and the array of the extrusion holes 31, the size of the shape-forming opening 41 of the chute 4, the haul-off speed of the haul-off machines 6, and the distance B1 between the endless belts 61a and 61b. This meets the variety of demands for the products. The three-dimensional net-like structure 10 manufactured by the method of the invention tends not to readily fatigue and accordingly has the longer life of the product.

The improved repulsion of the resulting three-dimensional net-like structure 10 advantageously decreases the amount of the material required to achieve the conventional repulsion and thereby reduces the total weight of the product. The improved dimensional accuracy reduces the overall strain as well as the roughness of the surface layer 12. In the application of the three-dimensional net-like structure 10 to bed mattress, even a thin mattress cover does not make the user uncomfortable.

Figure 8:
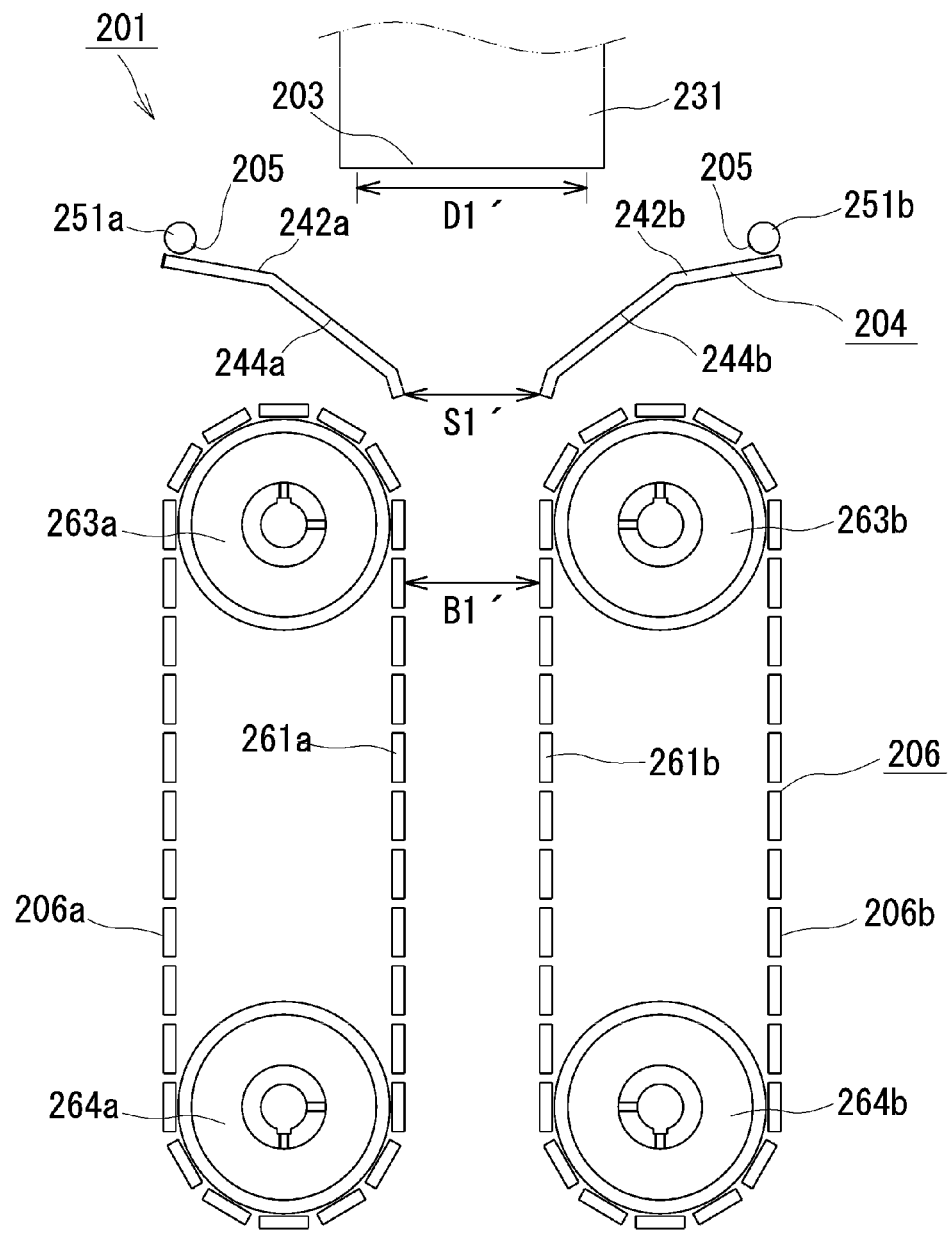
FIG. 8 is a diagram illustrating a side face of a manufacturing apparatus 201 of three-dimensional net-like structure according to embodiment 2 of the invention.
Figure 9:
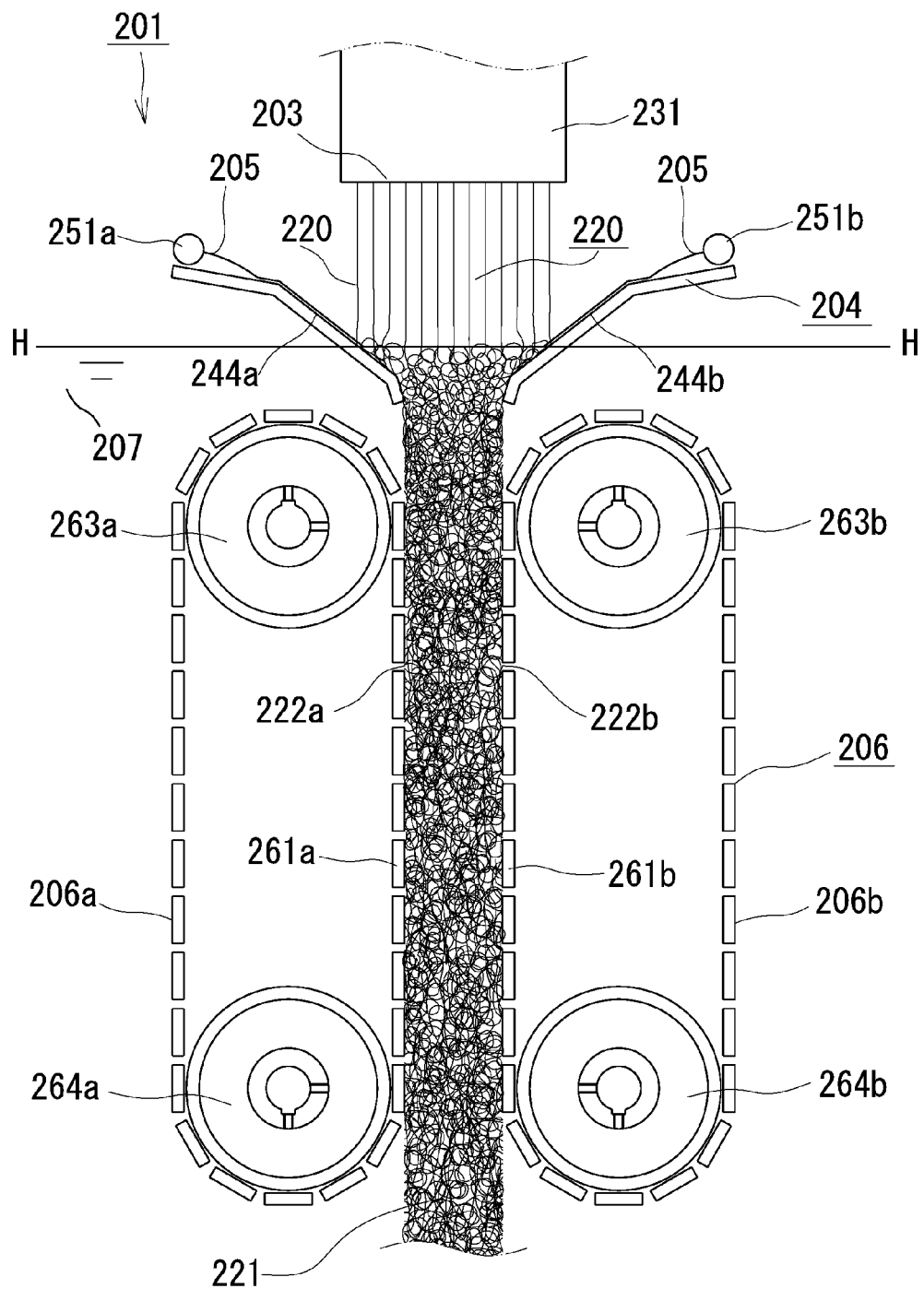
FIG. 9 is a diagram illustrating the manufacturing apparatus 201 of three-dimensional net-like structure according to embodiment 2 in use.
Figure 10:
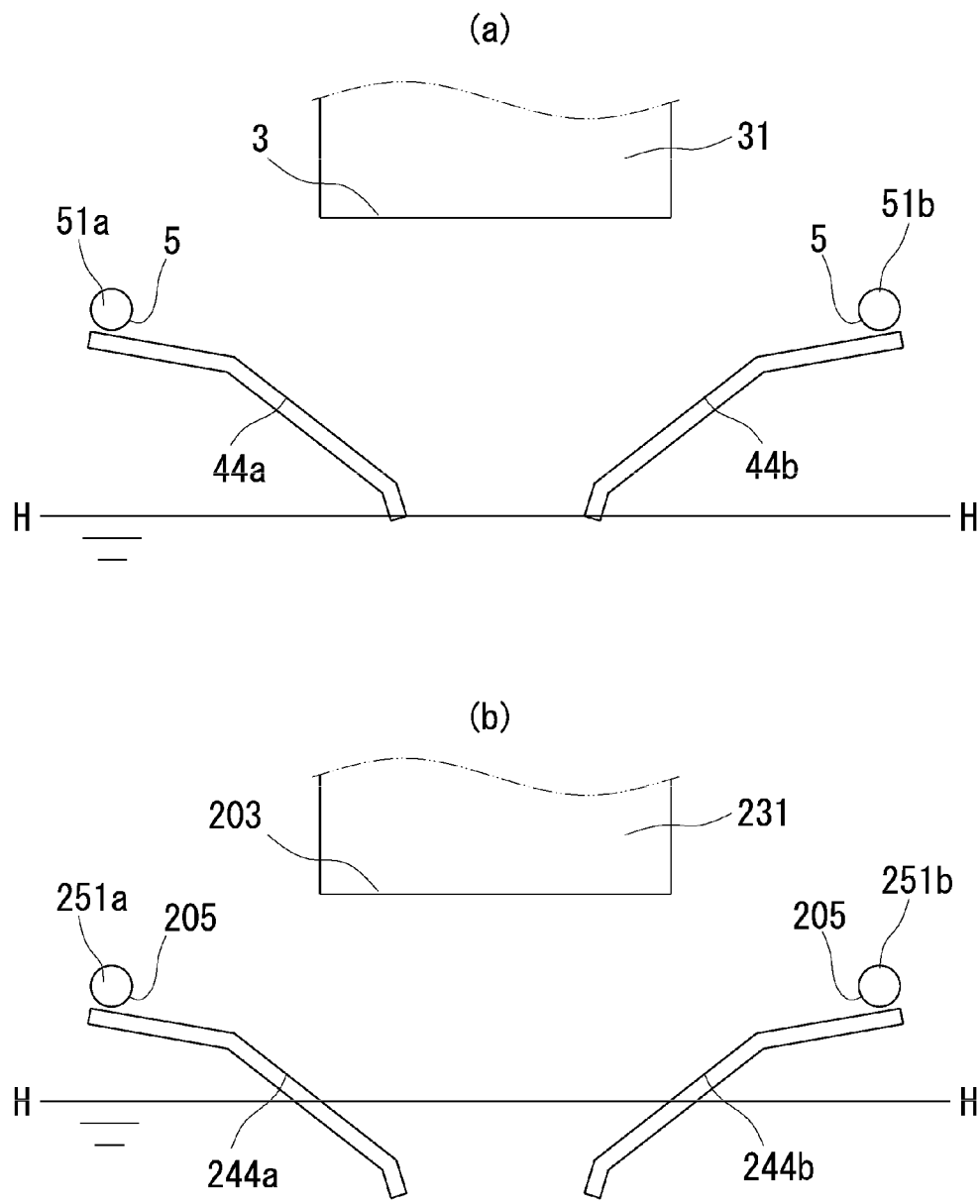
FIG. 10a is a diagram showing the water level H according to embodiment 1 of the invention.
FIG. 10b is a diagram showing the water level H according to embodiment 2 of the invention.

A manufacturing apparatus 201 of three-dimensional net-like structure according to embodiment 2 of the invention is described below with reference to FIGS. 8 to 10. The respective components are shown by the like numerals to those of embodiment 1 in the 200s, and the like components to those of embodiment 1 are not specifically explained here.

The manufacturing apparatus 1 of three-dimensional net-like structure according to embodiment 1 has the distance B1 between the pair of endless belts 61a and 61b of the haul-off machines 6 set less than the distance S1 between the lower ends of the inclined surfaces 44a and 44b of the chute 4 (FIG. 1). The manufacturing apparatus 201 of three-dimensional net-like structure, on the other hand, has a distance B1' between a pair of endless belts 261a and 261b set equal to a distance S1' between lower ends of inclined surfaces 244a and 244b (FIG. 8).

According to embodiment 2, the water level H is set at the height above the lower ends of the inclined surfaces 244a and 244b of the chute 204. The water level H is preferably set to the range of $2 \leq Wd' \leq 45$ (mm), more preferably set to the range of $3 \leq Wd' \leq 30$ (mm) and further more preferably set to the range of $5 \leq Wd' \leq 22$ (mm), where Wd' represents the height from the lower ends of the inclined surfaces 244a and 244b. The height Wd' of less than 2 mm may make the thickness of a resulting three-dimensional net-like structure 210 unstable and does not provide the advantageous effects described later. The excessively high water level may, on the other hand, cause weak adhesion of filaments 220. The height Wd' should thus be set in the predetermined range.

The water level of embodiment 2 is compared with the water level of embodiment 1. On the condition that fluctuation of the water surface is neglected, according to embodiment 1, the water level may be set at the height equal to the height of the lower ends of the inclined surfaces 44a and 44b of the chute 4 as shown in FIG. 10a. According to embodiment 2, however, as shown in FIG. 10b, the water level H should be set at the height above the lower ends of the inclined surfaces 244a and 244b of the chute 204. In other words, the water depth Wd' at the lower ends of the inclined surfaces 244a and 244b of the chute 204 should be not equal to or less than 0.

The manufacturing method of the three-dimensional net-like structure 210 according to embodiment 2 is described with reference to FIG. 9. A filament assembly 221 ejected from a plurality holes in a nozzle 203 in the same manner as that of embodiment 1 submerges in a water tank 207, before coming into contact with the inclined surfaces 244a and 244b of the chute 204. Such submerging disturbs the vertical fall of the respective filaments 220 and causes the respective filaments 220 to be tangled with the adjacent filaments 220 in loops and thermally adhere to one another. This forms the filament assembly 221 in the three-dimensional net-like shape. The filament assembly 221 is pulled and drawn by haul-off machines 206 and passes through a shape-forming opening 241 of the chute 204 prior to cooling and solidification, so as to be formed in the three-dimensional net-like shape. The filament assembly formed in the three-dimensional net-like shape by the series of operations described above is cut into a desired length to give the three-dimensional net-like structure 210.

The manufacturing method of embodiment 2 enables the three-dimensional net-like structure 210 to be produced by using the haul-off machines 206 that achieve compression molding simultaneously with haul-off of the filament assembly, even when the distance B1' between the endless belts 261a and 261b is set equal to the distance SF between the lower ends of the inclined surfaces 244a and 244b. Such advantageous effects of embodiment 2 similar to those of embodiment 1 are attributable to the following features. On the condition that the distance B1' between the endless belts 261a and 261b is equal to the distance S1' between the lower ends of the inclined surfaces 244a and 244b, when the water level is set at the height equal to the height of the lower ends of the inclined surfaces 244a and 244b of the chute 204, the filament assembly 221 is formed in the three-dimensional net-like shape substantially simultaneously with passing through the shape-forming opening 241. Accordingly the filament assembly 221 has substantially no repulsive force occurring in the cross section corresponding to the shape-forming opening 241. Substantially no compression is thus applied by the endless belts 261a and 261b having the distance B1' that is equal to the distance S1' in the short direction of the shape-forming opening 241. The manufacturing method according to embodiment 2 of the invention, however, sets the water level H at the height above the lower ends of the inclined surfaces 244a and 244b of the chute 204 and thus causes the filament assembly 221 to start formation in the three-dimensional net-like shape before passing through the shape-forming opening 241. The filament assembly 221 is pulled and drawn by the haul-off machines 206 and passes through the shape-forming opening 241, prior to cooling and solidification. Although the filament assembly 221 is not completely cooled down and solidified, the filament assembly 221 is formed in the three-dimensional net-like shape of the filaments tangled in loops and accordingly has some repulsive force. The filament assembly 221 is thus subjected to compression molding by the shape-forming opening 241 simultaneously with elastic deformation, while passing through the shape-forming opening 241. By using such elasticity, the filament assembly 221 passing through the shape-forming opening 241 can be compressed between and pulled and drawn by the pair of endless belts 261a and 261b opposed to each other across the same distance B1' as the distance S1' in the short direction of the shape-forming opening 241.

According to embodiment 2, in order to give the elasticity to the filament assembly 221 by the shape-forming opening 241 and the distance B1' between the endless belts 261a and 261b, it is preferable to set the distance S1' between the lower ends of the inclined surfaces 244a and 244b less than a short side length D1' of the array of the nozzle 203 by 6 to 25%. The reduction percentage of less than 6% may make the thickness of the three-dimensional net-like structure 210 unstable and cause difficulty in haul-off of the filament assembly by the haul-off machines 206. This does not provide the advantageous effects of the embodiment sufficiently. The relationship between the short side length D1' of the array of the nozzle 203 and the distance S1' between the lower ends of the inclined surfaces 244a and 244b is set, depending on the properties of the thermoplastic synthetic resin used and the application of the resulting three-dimensional net-like structure 210. The reduction percentage of not less than 6% is preferable for the smooth surface finishing. It is more preferable to set the distance S1' between the lower ends of the inclined surfaces 244a and 244b less than the short side length D1' of the array of the nozzle 203 by 3 to 10%, and reduction percentage of 4 to 7% is further more preferable.

The manufacturing method of embodiment 2 may adjust the water level H to allow part of longitudinal faces 222a and 222b of the periphery of the filament assembly 221 to be in contact with the inclined surfaces 244a and 244b of the chute 204 before coming into contact with the water surface and subsequently to be in contact with and tangled with the adjacent filaments 220 while passing through the shape-forming opening 241. The three-dimensional net-like structure 210 of embodiment 2 accordingly has a surface layer 212 of the filaments 220 tangled two-dimensionally by coming into contact with the inclined surfaces 244a and 244b.

Figure 11:
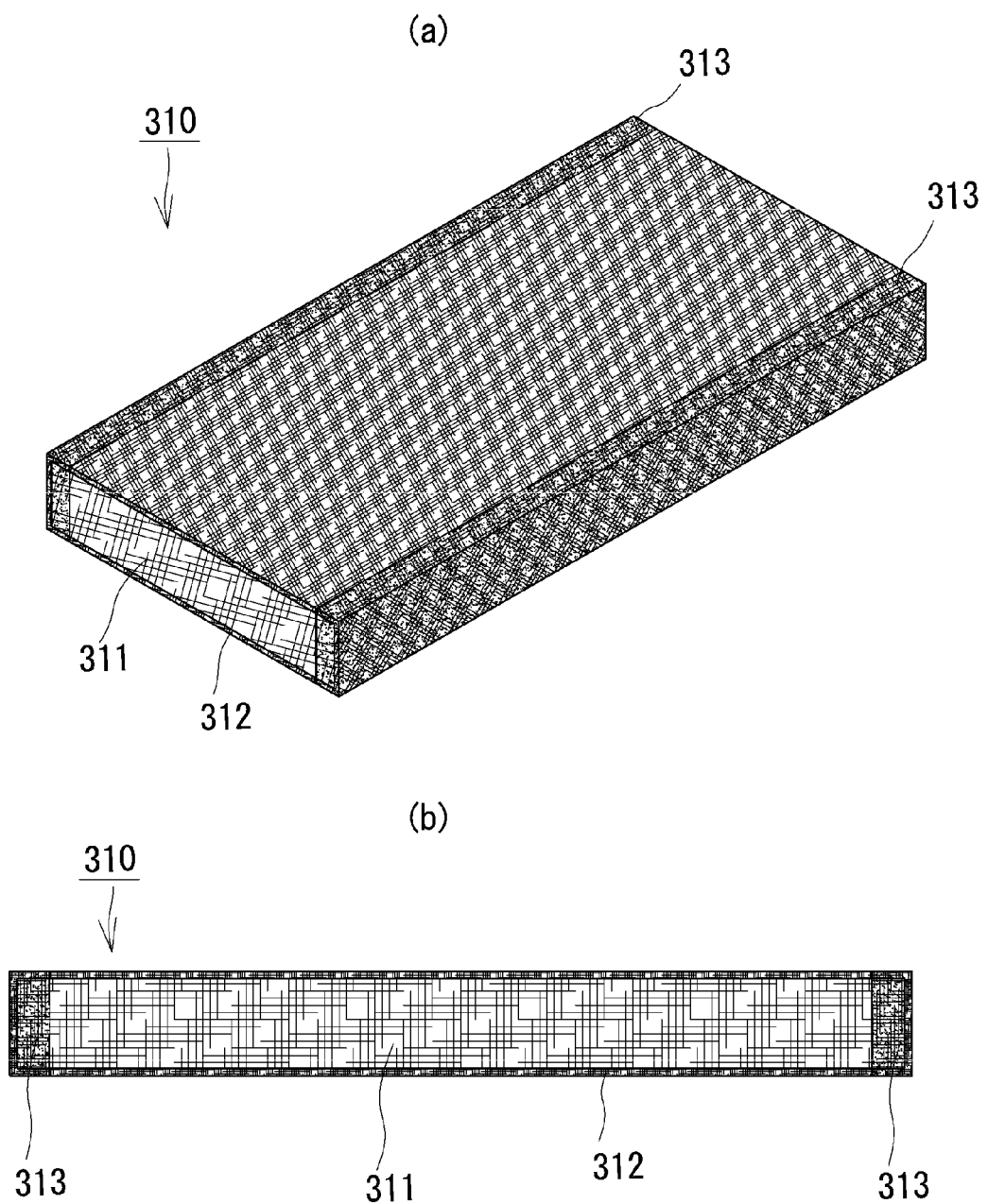
FIG. 11a is a perspective view illustrating a three-dimensional net-like structure 310 according to embodiment 3 of the invention.
FIG. 11b is a front view illustrating the three-dimensional net-like structure 310 according to embodiment 3.

A three-dimensional net-like structure 310 according to embodiment 3 of the invention is described below with reference to FIG. 11. The respective components are shown by the like numerals to those of embodiment 1 in the 300s, and the like components to those of embodiment 1 are not specifically explained here.

As shown in FIGS. 11a and 11b, the three-dimensional net-like structure 310 according to embodiment 3 has harder side portions 313 of the greater bulk density than that of the other portions at the locations corresponding to short-direction faces 323c and 323d of a filament assembly 321.

Figure 12:
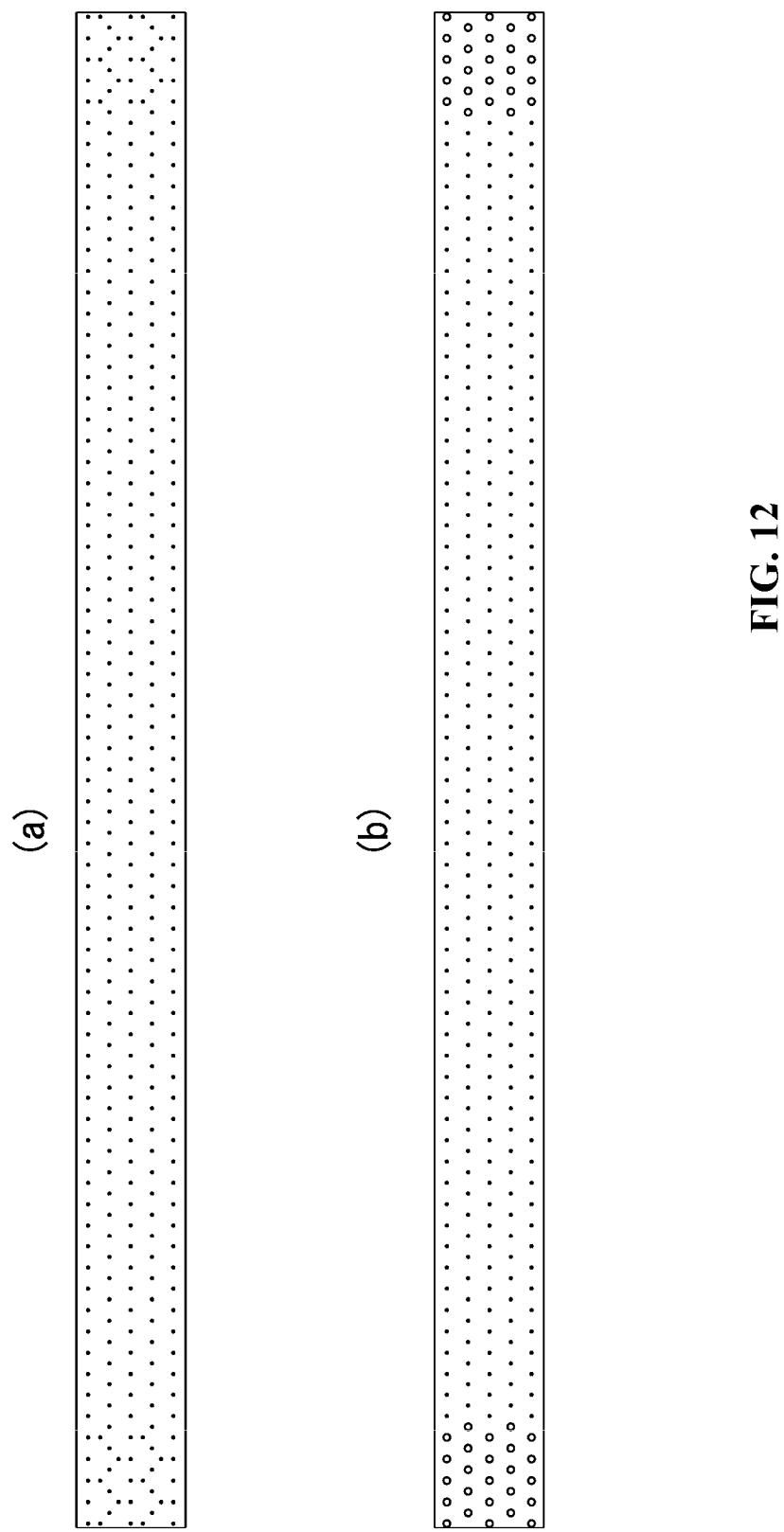
FIGS. 12a and 12b are diagrams showing arrays of extrusion holes 331 in a nozzle 303 according to embodiment 3.

As shown in FIG. 12a, in a manufacturing apparatus 301 of three-dimensional net-like structure, the harder side portions 313 are formed by increasing the number of extrusion holes 331 in areas proximate to both ends of a nozzle 303 in the longitudinal direction to be greater than the number of the extrusion holes 331 in a remaining area. The harder side portions 313 may also be formed by increasing the size of extrusion holes 331 in areas proximate to both ends of the nozzle 303 in the longitudinal direction to be greater than the size of the extrusion holes 331 in a remaining area (FIG. 12b). The harder side portions 313 may also be formed by setting the long side length D2 in the array of the extrusion holes 31 according to embodiment 1 to be considerably greater than the distance S2 between the lower ends of the inclined surface 45c and the inclined surface 45d.

The following describes advantageous effects of embodiment 3. Forming the harder side portions 313 protects the side surfaces of the three-dimensional net-like structure 310 from being crushed and improves the durability and the internal aeration, for example, in the application to bed mattress. The harder side portions 313, however, have different repulsion from that of the other portions and thereby have difficulty in uniform formation. This may cause the low dimensional accuracy of the manufactured three-dimensional net-like structure 310. The manufacturing method of embodiment 3 applies compression by a pair of endless belts 361a and 361b having the less distance B1 than the distance of a shape-forming opening 341 of a chute 304 like the manufacturing method of embodiment 1. This enhances the dimensional accuracy of a surface layer 312 of the three-dimensional net-like structure 310. The structure of embodiment 3 having such advantageous effects is based on the structure of embodiment 1, but similar advantageous effects may be achieved by application of the structure of embodiment 2 as the base structure of embodiment 3.

The diameter of extruded filaments 320 is preferably in the range of 0.2 to 2.0 mm φ, more preferably in the range of 0.3 to 1.5 mm φ and most preferably in the range of 0.5 to 0.9 mm φ. These values are, however, not restrictive. The filaments of the greater diameter or the filaments of elongate cross section may be used to form the harder side portions 313. The filaments may be solid or may be hollow.

The manufacturing method of embodiment 3 varies the bulk density in the locations of the three-dimensional net-like structure 310. It is preferable that even the portion of the low bulk density has the level of 0.020 g/cm$^3$. The bulk density of less than 0.015 g/cm$^3$ may cause failed adhesion of the extruded filaments. In the application of the three-dimensional net-like structure 310 to bed mattress, it is preferable that even the portion of the high bulk density has the level of 0.087 g/cm$^3$. The bulk density of greater than 0.087 g/cm$^3$ gives the repulsion of greater than 19.6 kPa, which is inadequate for the bed mattress. These upper limit and lower limit of bulk density are only standard values, and the invention may be implemented with the bulk density that partially exceeds these limits.

The bulk density of the harder side portions 313 of the three-dimensional net-like structure 310 is preferably 0.050 to 0.300 g/cm$^3$, more preferably 0.070 to 0.250 g/cm$^3$ and most preferably 0.080 to 0.200 g/cm$^3$.

The bulk density of the portions other than the harder side portions 313 is preferably 0.030 to 0.110 g/cm$^3$, more preferably 0.040 to 0.095 g/cm$^3$ and most preferably 0.045 to 0.085 g/cm$^3$.

The ratio of the bulk density of the harder side portions 313 to the bulk density of the central portion as the portion other than the harder side portions 313 is preferably in the range of harder side portions:central portion=1.3:1 to 4:1.

The width of the harder side portions 313 having the higher bulk density to form the hardened end areas is preferably in the range of 40 to 90 mm from the edge in the width direction, more preferably in the range of 50 to 80 mm and most preferably in the range of 60 to 75 mm.

The surface layer 312 is formed like a thin film and accordingly has difficulty in measurement of the bulk density. When the average bulk density in the bulk density distribution to the depth having the higher bulk density than the bulk density of an inside part 311 is expressed as the bulk density of the hardened surface layer, the ratio of the bulk density of the hardened surface layer to the bulk density of the inside part is roughly in the range of 1.5:1 to 6:1.

The average bulk density of the entire three-dimensional net-like structure 310 is preferably 0.060 to 0.084 g/cm$^3$, more preferably 0.063 to 0.080 g/cm$^3$ and most preferably 0.066 to 0.075 g/cm$^3$.

In order to obtain the three-dimensional net-like structure 310 having the bulk density described above, when the amount of the material supplied per hour to the area of 10 cm$^2$ of the shape-forming opening 341 is 0.20 to 0.40 kg/minute, the haul-off speed of the filaments 320 by haul-off machines 306 is preferably 40 to 65 cm/minute.

A three-dimensional net-like structure 410 according to embodiment 4 of the invention is described below with reference to FIG. 13. The respective components are shown by the like numerals to those of embodiment 1 in the 400s, and the like components to those of embodiment 1 are not specifically explained here.

Figure 13:
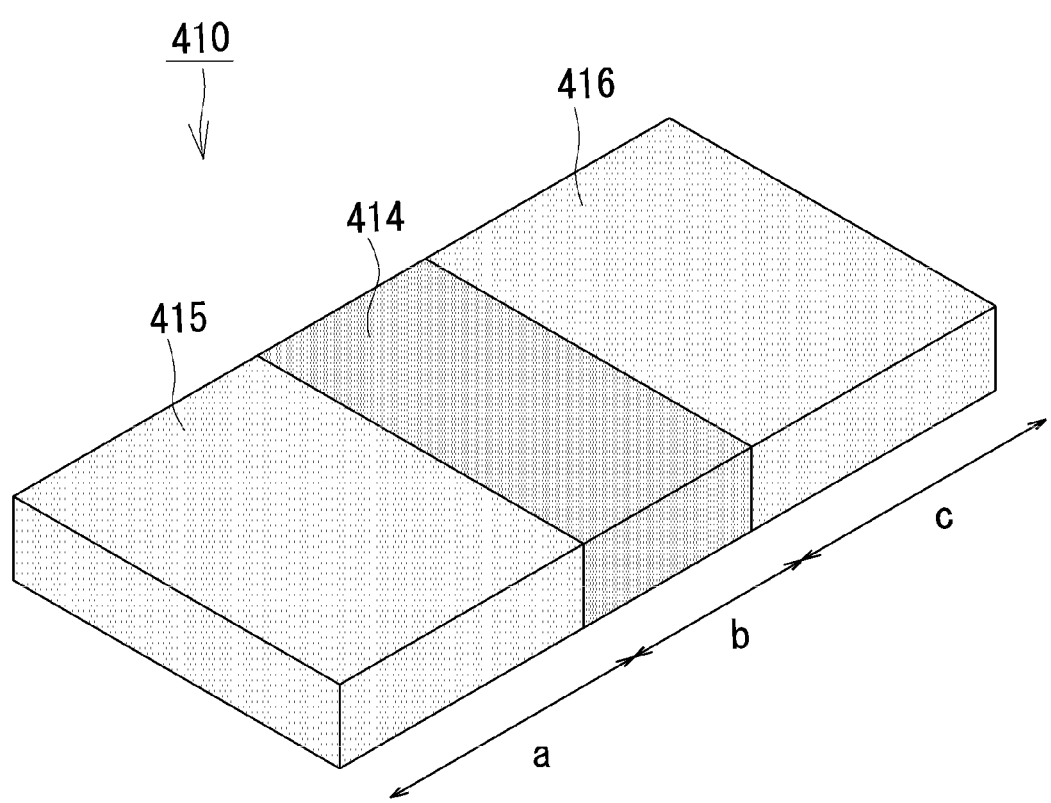
FIG. 13 is a perspective view illustrating a three-dimensional net-like structure 410 according to embodiment 4 of the invention.

As shown in FIG. 13, the three-dimensional net-like structure 410 of embodiment 4 has a harder center portion 414 of the higher bulk density than the bulk density of other portions formed in a predetermined area in the direction corresponding to the haul-off direction of a filament assembly 421 in the manufacturing process.

The harder center portion 414 is formed by decreasing the haul-off speed of haul-off machines 406 for a predetermined time in the manufacturing process to relatively increase the supply of the filaments 420 and thereby increase the bulk density of the resulting filament assembly 421 in the predetermined time.

The following describes the advantageous effects of embodiment 4. The harder center portion 414 having the relatively higher bulk density than the bulk density of the other portions naturally has the greater repulsion. When load is applied unevenly during the use of the three-dimensional net-like structure 410, providing the harder center portion 414 at the location where the load is concentrated enables the uneven load to be received adequately. For example, in the application of the three-dimensional net-like structure 410 to bed mattress, providing the harder center portion 414 at the location corresponding to the user's lower back enables the user's lower back where the body weight is concentrated during sleep to be securely supported and keeps the user's favorable posture. The harder center portion 414, however, has different repulsion from that of the other portions and thereby has difficulty in uniform formation. This may cause the low dimensional accuracy of the manufactured three-dimensional net-like structure 410. The manufacturing method of embodiment 4 applies compression by a pair of endless belts 461a and 461b having the less distance B1 than the distance of a shape-forming opening 441 of a chute 404 like the manufacturing method of embodiment 1. This enhances the dimensional accuracy of a surface layer 412 of the three-dimensional net-like structure 410. The structure of embodiment 4 having such advantageous effects is based on the structure of embodiment 1, but similar advantageous effects may be achieved by application of the structure of embodiment 2 as the base structure of embodiment 4.

In the application to bed mattress, the three-dimensional net-like structure 410 has the harder center portion 414 formed at the location corresponding to the user's lower back and other portions 415 and 416 (FIG. 13). The bulk density of the harder center portion 414 is preferably in the range of 0.035 to 0.110 g/cm$^3$. The bulk density of the other portions 415 and 416 is preferably in the range of 0.030 to 0.100 g/cm$^3$. The preferable relation of length a of the portion 415, length b of the portion 414 and length c of the portion 416 is, for example, a:b:c=1:1:1. This relation should be changed by taking into account various factors and this ratio is not at all restrictive.

A three-dimensional net-like structure 510 according to embodiment 5 of the invention is described below with reference to FIGS. 14 to 17. The respective components are shown by the like numerals to those of embodiment 1 in the 500s, and the like components to those of embodiment 1 are not specifically explained here.

For manufacture of the three-dimensional net-like structure, a chute is generally used to guide the falling filaments in the molten state. The filaments, however, tend to be stuck on the upper surface of the chute, and a high flow of cooling water is generally required on the upper surface of the chute. The excessive flow of cooling water supplied to the chute, however, undesirably cools down the filaments. This may cause poor adhesion of the filaments tangled in loops. The insufficient flow of cooling water, on the other hand, causes the thermoplastic synthetic resin falling from the nozzle to be accumulated on the upper surface of the chute. This may cause irregularities on the surface of the manufactured three-dimensional net-like structure or cause formation of elongated filaments. The supply of cooling water may be unstable. For example, the flow of well water may vary with time depending on the pump condition. Such variation in flow of cooling water may change the surface of the manufactured three-dimensional net-like structure and the adhesion of the individual filaments and interfere with stable manufacture of the products.

The inventors developed an iron chute, a stainless steel chute and a fluororesin chute, in order to solve the problems of the varying flow of cooling water supplied to the chute and the filaments stuck on the surface of the chute and the resulting unstable manufacture of products. These developed chutes, however, have uneven surface friction and high resistance due to the non-uniform water spread or adhesion of oil on the surface of the chute and thereby require the high flow of water. The inventors then developed a chute shot-blasted to the surface roughness of RZ1 to 80 and a chute coated with ceramics without surface polishing, in order to improve the hydrophilicity of the chute. These developed chutes decrease the required flow of water but still have the similar problem to that of the iron chute, the stainless steel chute and the fluororesin chute described above.

In order to solve the problems of the varying flow of cooling water supplied to the chute and the stuck filaments, the inventors have accordingly covered the upper surface of the chute with a water permeable sheet (for example, cloth) to equalize the water spread and supply the water flow to the chute with the water permeable sheet. This enables manufacture of the three-dimensional net-like structure having the higher dimensional accuracy and the higher surface smoothness. Fixation of an upper end and a lower end of the water permeable sheet to the chute prevents undulation of the water permeable sheet and facilitates maintenance of the water permeable sheet.

Figure 14:
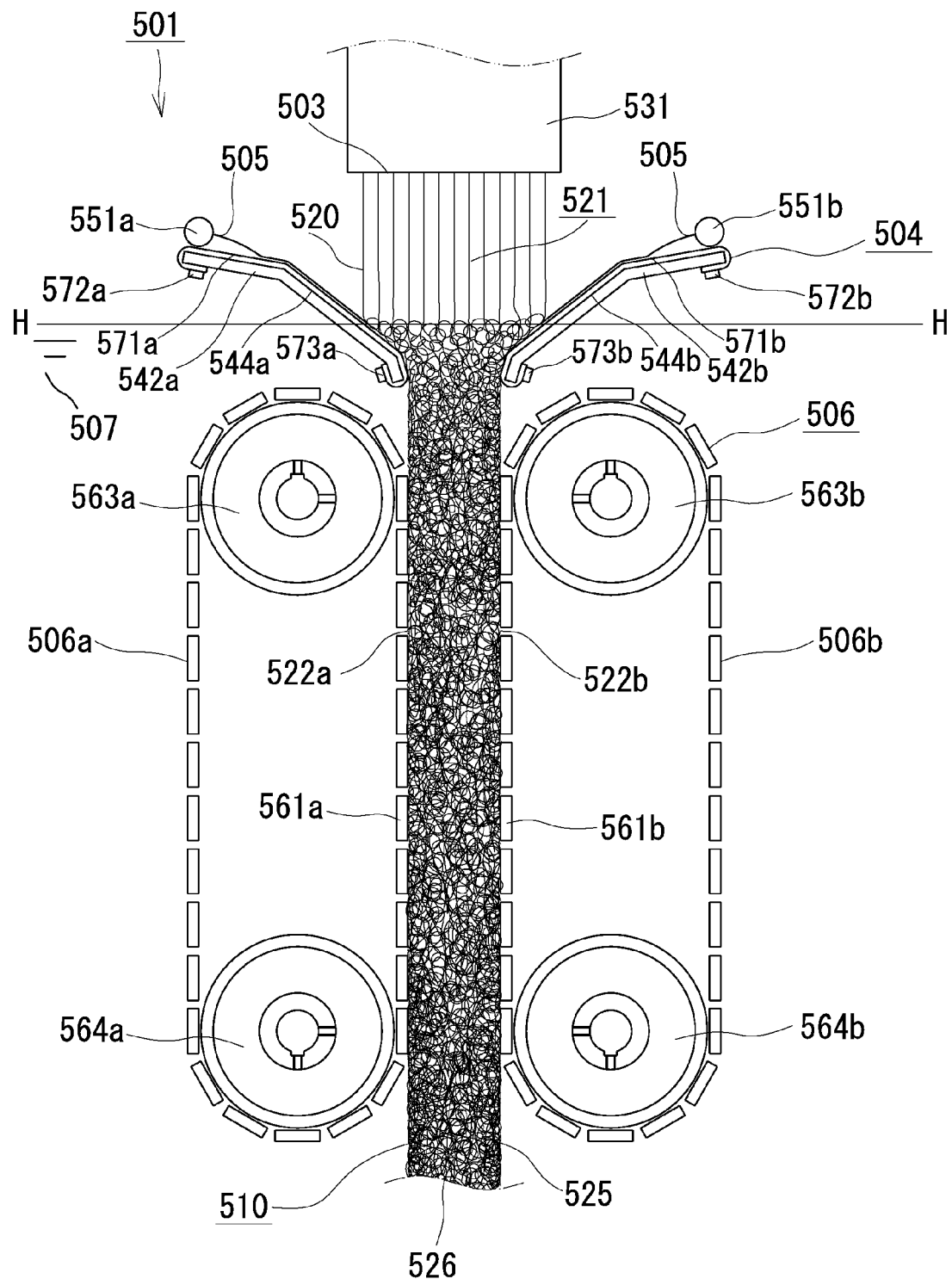
FIG. 14 is a diagram illustrating a manufacturing apparatus 501 of three-dimensional net-like structure according to another embodiment of the invention in use.

As shown in FIG. 14, a manufacturing apparatus 501 of three-dimensional net-like structure is provided as an apparatus for manufacturing a three-dimensional net-like structure 510 formed from filaments 520 of a thermoplastic synthetic resin tangled in loops at random and thermally adhering to one another at the tangles. The manufacturing apparatus 501 of three-dimensional net-like structure includes a nozzle 503, a chute 504 located below the nozzle 503, water supply ports 505 located above the chute 504 and haul-off machines 506 located below the chute 504. According to this embodiment, a water permeable sheet 571 is provided to cover the upper surface of the chute 504 and is fixed at its upper end and lower end to the rear face of the chute 504 by means of upper fixation elements 572a and 572b and lower fixation elements 573a and 573b. Cooling water is supplied to the upper surface of the chute 504. The filaments 520 on the surface layer of a filament assembly 521 are formed in loops and come into contact with and are tangled with the adjacent filaments 520 to form a surface layer 525 of the higher bulk density and an inside part 526 of the lower bulk density. The width of the filament assembly 521 is reduced by 6 to 25%, preferably by 3 to 10% or more preferably by 4 to 7% to form the three-dimensional net-like structure 510.

Figure 15:
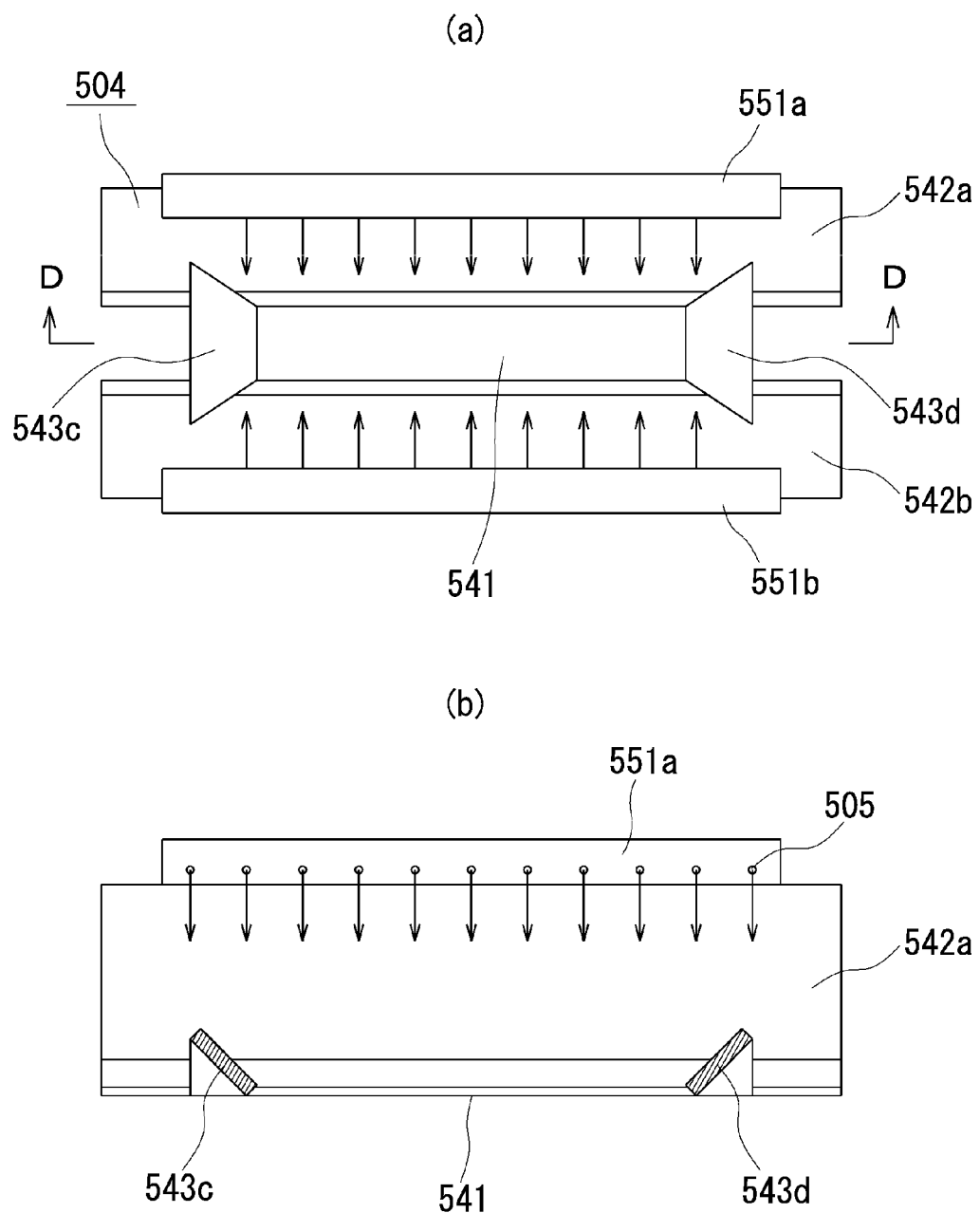

As shown in FIG. 15, the chute 504 has long chutes 542a and 542b and short chutes 543c and 543d. The respective components of the chute 504 preferably have the inclination angle of 35 to 45 degrees. The long chutes 542a and 542b in the longitudinal direction and the short chutes 543c and 543d in the short direction are assembled in a rectangular shape to form a rectangular shape-forming opening 541 on the center. According to this embodiment, the short chutes 543c and 543d are designed to have the greater inclination angle and the smaller length than the inclination angle and the length of the long chutes 542a and 542b. This design is, however, not restrictive. Depending on the size of the product, it may be sufficient to provide supply pipes 551a and 551b only on the long chutes 542a and 542b. Separate water supply ports may additionally be provided on the short chutes 543c and 543d. Each of the long chutes 542a and 542b may not have the vertical cross section bent in the middle.

The water permeable sheet 571 includes water permeable sheets 571a and 571b provided as sheet members having water permeability to cover over the respective upper surfaces of the long chutes 542a and 542b as shown in FIG. 14. The water permeable sheets 571a and 571b placed to cover over the long chutes 542a and 542b are fixed to the long chutes 542a and 542b by means of the upper fixation elements 572a and 572b and the lower fixation elements 573a and 573b provided at the upper ends and the lower ends of the long chutes 542a and 542b. The supply pipes 551a and 551b are located above the long chutes 542a and 542b and outside of the water permeable sheets 571a and 571b. According to this embodiment, no water permeable sheet 571 is provided on the short chutes 543c and 543d arranged perpendicular to the long chutes 542a and 542b to form the short-direction sides of the three-dimensional net-like structure 510 (FIG. 15). This is, however, not restrictive and water permeable sheet may be provided on the short chutes 543c and 543d.

The three-dimensional net-like structure 510 formed in a rectangular parallelepiped shape has right-angle corners and accordingly has no problem in surface uniformity. Even in the three-dimensional net-like structure 510 with chamfered corners, however, the presence of the water permeable sheet and the resistance of water allow formation of the uniform surface layer.

The water permeable sheet 571 is made of cotton cloth according to this embodiment. This material is, however, not restrictive but may be replaced with another suitable material having water permeability and flexibility. For example, the material may be polyester cloth or fine metal mesh. The cloth material is not limited to cotton or polyester but may be, for example, nylon, polypropylene, vinylidene chloride, resin like fluororesin, silk or linen. The metal mesh that is made of stainless steel or another metal may have 50 to 500 meshes per inch and the line diameter of 0.3 to 0.015 and may be plain-woven or twill-woven. The metal mesh may be punching metal mesh.

Figure 17:
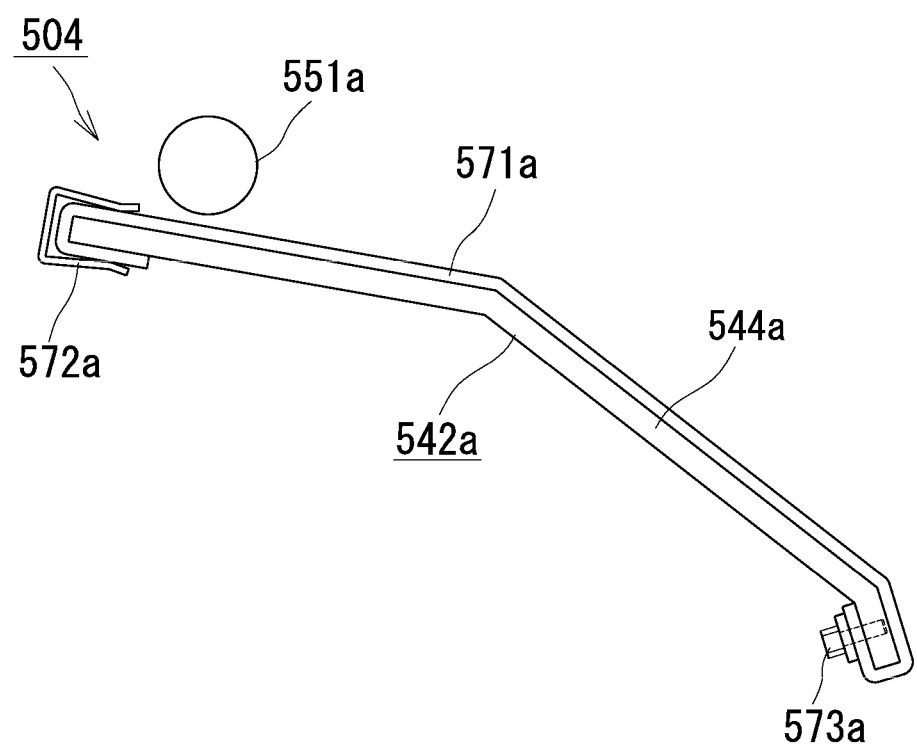
FIG. 17 is a diagram illustrating a method of fixing a water permeable sheet 571 for the chute 504 of the embodiment.

Any of various methods may be adopted to fix the upper fixation elements 572a and 572b and the lower fixation elements 573a and 573b. For example, as shown in FIG. 17, the upper fixation elements 572a and 572b may be clips, and the lower fixation elements 573a and 573b may be screws fastened to the rear face of the chute 504. According to one preferable procedure, screw holes may be formed in the plate thickness of the long chutes 542a and 542b via a plate placed over the width direction of the long chutes 542a and 542b.

The haul-off machines 506 are provided as a pair of haul-off machines 506a and 506b. The detailed structure is described previously. The longitudinal direction of the haul-off machines 506 is parallel to the long chutes 542a and 542b. The upper ends of the haul-off machines 506 are located below the long chutes 542a and 542b. In the illustrated example of FIG. 14, the distance between the opposed long chutes 542a and 542b is equal to the distance between the opposed haul-off machines 506a and 506b (like embodiment 2). The distance between the opposed long chutes 542a and 542b may be set greater than the distance between the opposed haul-off machines 506a and 506b (like embodiment 1), and the thickness of the three-dimensional net-like structure 510 may be further reduced by the haul-off machines 506.

The water level H is preferably at or above the height of the lower ends of the chute 504 and is desirably at or above the height of the first bent (FIG. 16a). Depending on the water level, the upper ends of the haul-off machines may be submerged or may be exposed from the water surface. The distance between the opposed haul-off machines 506 is equal to or less than the distance between the lower ends of the opposed long chutes 542a and 542b. The illustrated example has the distances equal to each other.

As the supply flow of cooling water, 0.8 L/min per 1 meter of the length of the long chutes 542a and 542b adjacent to the shape-forming opening 541 is insufficient. The flow of 1.0 L/min gives the substantially uniform water surface, and the flow of 1.3 L/min gives the favorably uniform water surface. The flow of 4.0 L/min is excessive and causes accumulation of the air under the water permeable sheets 571a and 571b.

The following describes the results of measurement of the adhesion strength (tensile strength) per flow of cooling water in the three-dimensional net-like structure 510 with the water permeable sheets 571a and 571b and in the three-dimensional net-like structure 510 without the water permeable sheets 571a and 571b. The subject of the measurement was the three-dimensional net-like structure of 35 mm in thickness×5 cm in width×8 cm in length having the bulk density of 0.0749 g/cm$^3$ as a test piece. The measurement test fixed the upper end and the lower end of the test piece with chucks and measured the tensile forces applied to a spring scale when the test piece was elongated by 10 mm (when the adhesion started coming off) and when the test piece was elongated by 30 mm, as the indication of the adhesion strength.

In the presence of the water permeable sheets 571a and 571b, under the condition of the water flow of 1.5 L/min per 1 meter, the adhesion started coming off when the test piece was elongated by 10 mm. The tensile force in this state was 41.1 N. The tensile force was 117.6 N when the test piece was elongated by 30 mm.

In the absence of the water permeable sheets 571a and 571b, on the other hand, under the condition of the water flow of 10 L/min per 1 meter, the adhesion started coming off when the test piece was elongated by 10 mm. The tensile force in this state was 25.5 N. The tensile force was 39.2 N when the test piece was elongated by 30 mm. These results of measurement show that the three-dimensional net-like structure 510 manufactured with the water permeable sheets 571a and 571b has the higher adhesion strength.

Figure 16:
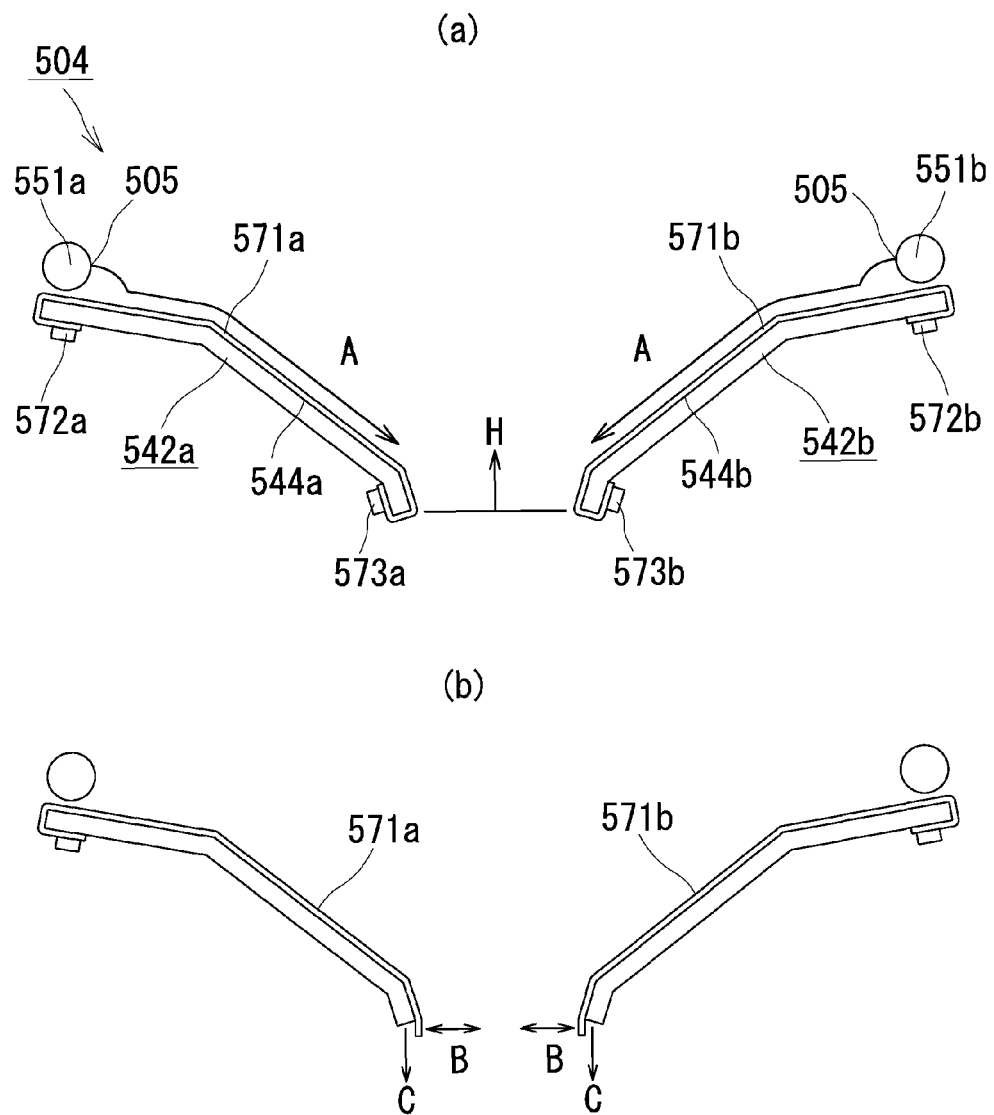

The following describes the features and the advantageous effects of embodiment 5 of the invention. As shown in FIG. 14 to FIG. 16a, the cooling water supplied through the supply pipes 551a and 551b to the long chutes 542a and 542b permeates through the water permeable sheets 571a and 571b on the upper surfaces of the long chutes 542a and 542b to form the layer of cooling water on the upper surfaces and makes the flows on the upper surfaces of the long chutes 542a and 542b (FIG. 16a). The presence of the water permeable sheets 571a and 571b improves the hydrophilicity of the upper surfaces of the long chutes 542a and 542b and enables the cooling water layer to be evenly and uniformly spread over the upper surfaces of the long chutes 542a and 542b. The presence of the water permeable sheets 571a and 571b can thus decrease the supply of cooling water without causing the stuck filaments 520 or insufficient cooling. This also prevents poor formation of the three-dimensional net-like structure 510 with no influence of oil derived from the material resin of the filaments 520 and enables the filament assembly 521 to be smoothly cooled down and solidified to form the three-dimensional net-like structure 510.

As shown in FIG. 16b, in the application without the lower fixation elements 573a and 573b, the large part of cooling water may flow out from the rear faces of the water permeable sheets 571a and 571b as shown by the arrows C without formation of the cooling water layer. The water permeable sheets 571a and 571b may flap in the directions of the arrows B. The water permeable sheets 571a and 571b may be crinkled or crumpled. Any of these may cause poor formation, such as concaved surface, of the three-dimensional net-like structure 510. Especially the wrinkles formed in the water permeable sheets 571a and 571b along the falling direction of the filaments 520 adversely affect the appearance of the product. In the manufacturing apparatus 501 of three-dimensional net-like structure according to the invention, however, the water permeable sheets 571a and 571b are fixed to the long chutes 542a and 542b by means of the upper fixation elements 572a and 572b and the lower fixation elements 573a and 573b. This arrangement advantageously prevents formation of wrinkles and thereby poor formation of the three-dimensional net-like structure 510. In the illustrated example of FIG. 17, using the clips for the upper fixation elements 572a and 572b facilitates attachment and detachment of the water permeable sheets 571a and 571b. The lower fixation elements 573a and 573b screwed to the rear faces allow the water permeable sheets 571a and 571b to be securely fixed without affecting the upper surfaces of the chute 504 as the surfaces of forming the three-dimensional net-like structure 510. The water permeable sheets 571a and 571b are readily replaceable at the frequency of, for example, once a month and thus assure easy maintenance.

Depending on the specification of the product which the three-dimensional net-like structure 510 is applied to, it may be required to form the thick surface layer 525 having the higher bulk density than that of the inside part 526. The thick surface layer 525 may be formed by increasing the width of the array of extrusion holes 532 of the nozzle 503 (corresponding to the short side length D1 shown in FIG. 2a) relative to the width of the shape-forming opening 541 (corresponding to the distance S1 shown in FIG. 2b). This increases the supply of the filaments 520 to the location where the surface layer 525 is formed. The increased supply of the filaments 520, however, causes the filaments 520 to be cooled down only insufficiently on the chute 504. This may disadvantageously deform the filaments 520, which may adhere to one another in the molten state and form resin agglomeration. This increases the bulk density only in the part of the filament assembly 521 corresponding to the very shallow part of the surface layer 525 and causes the inner part of the surface layer 525 to be hardly cooled down on the chute 504. This causes the irregular or uneven surface of the resulting three-dimensional net-like structure 510. This problem is attributable to the deterioration of the cooling performance of the cooling water, which is supplied from the water supply ports 505 and is heated by coming into contact with the filaments 520. This problem is accordingly significant especially in the lower part of the chute 504. Increasing the supply of cooling water to prevent such deformation of the filaments 520, however, causes the part of the filament assembly 521 corresponding to the very shallow part of the surface layer 525 to be overcooled and thereby gives poor adhesion of the filaments 520.

Using the water permeable sheets 571a and 571b like this embodiment, on the other hand, causes the cooling water prior to heating to be leaked through the water permeable sheets 571a and 571b, in addition to the cooling water supplied on the chute 504. This arrangement thus significantly reduces the deterioration of the cooling performance described above. Using the water permeable sheets 571a and 571b allows formation of the thick surface layer 525 with reducing the required amount of cooling water.

A manufacturing apparatus 601 of three-dimensional net-like structure according to embodiment 6 of the invention is described below with reference to FIGS. 18 and 19. The respective components are shown by the like numerals to those of embodiment 5 in the 600s, and the like components to those of embodiment 5 are not specifically explained here.

Figure 18:
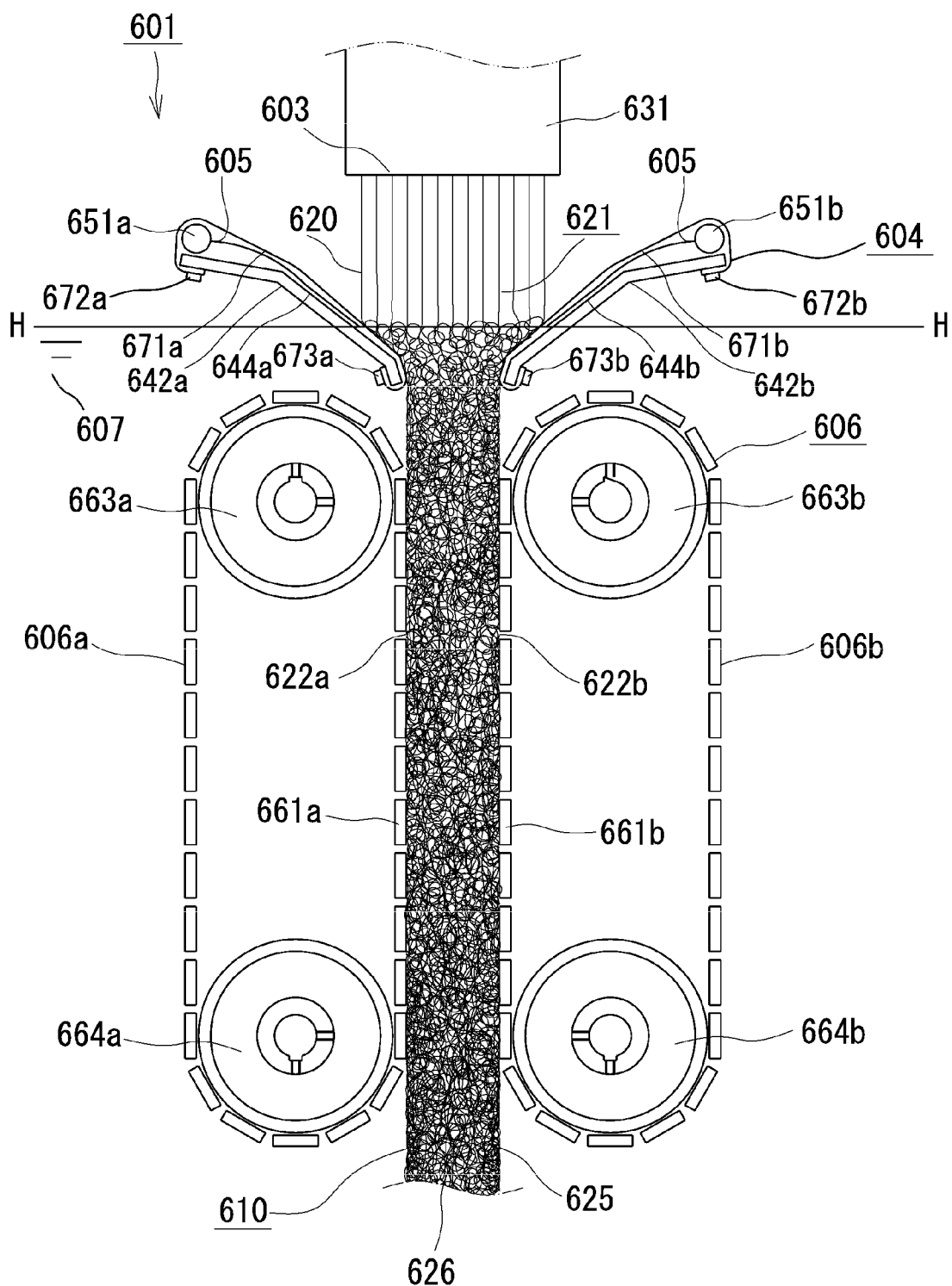
FIG. 18 is a diagram illustrating a manufacturing apparatus 601 of three-dimensional net-like structure according to another embodiment of the invention in use.
Figure 19:
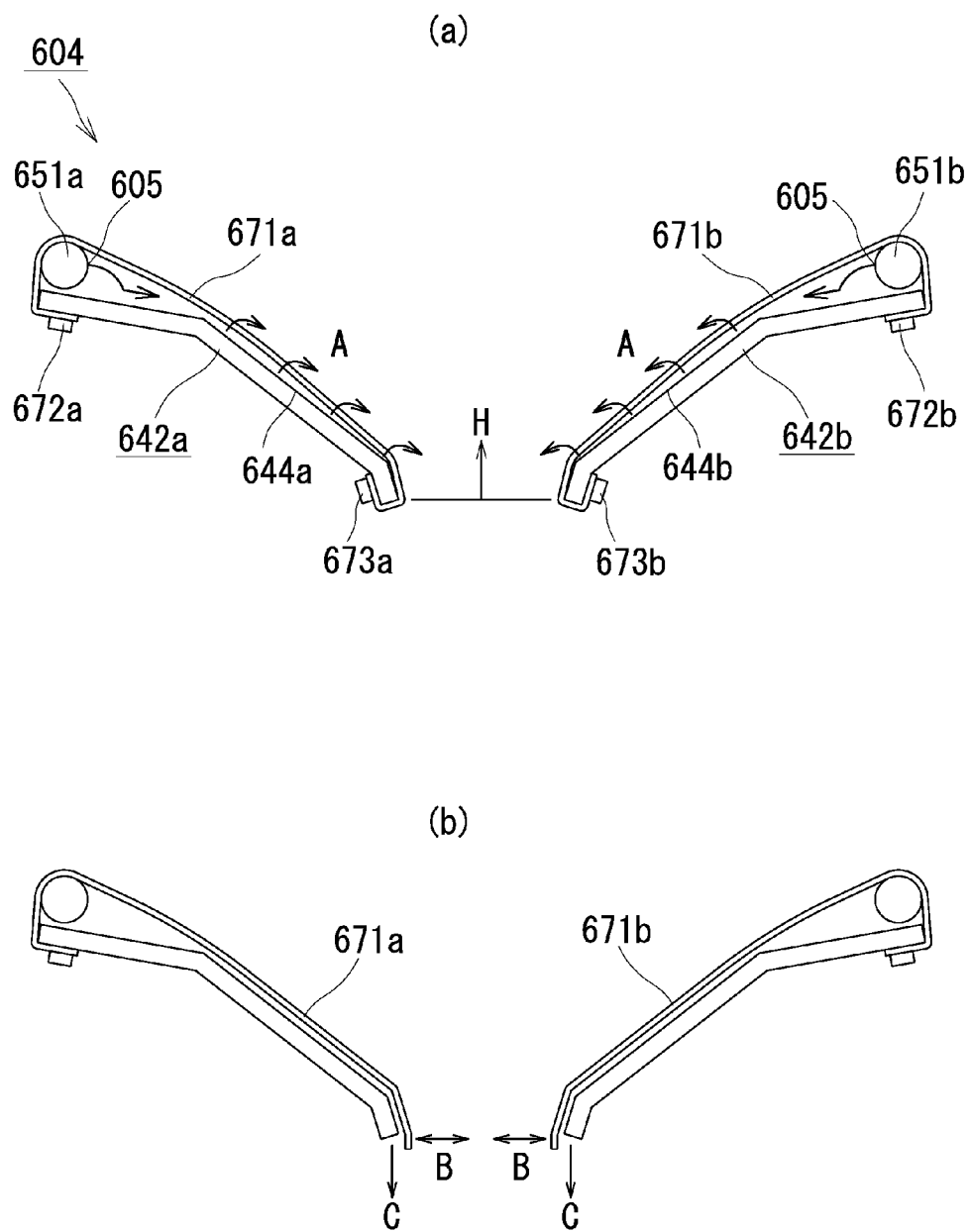

As shown in FIG. 18, the manufacturing apparatus 601 of three-dimensional net-like structure has water permeable sheets 671a and 671b used to cover over supply pipes 651a and 651b in addition to long chutes 642a and 642b. Like the manufacturing apparatus of embodiment 5, the supply pipes 451a and 651b are located above the long chutes 642a and 642b. The water permeable sheets 671a and 671b are provided to cover the supply pipes 651a and 651b, as well as the upper side of the long chutes 642a and 642b. The water permeable sheets 671a and 671b are fixed to the long chutes 642a and 642b by means of upper fixation elements 672a and 672b and lower fixation elements 673a and 673b provided at the upper ends and the lower ends of the long chutes 642a and 642b.

The following describes the features and the advantageous effects of embodiment 6 of the invention. As shown in FIGS. 18 and 19a, cooling water is supplied from water supply ports 605 of supply pipes 651a and 651b to the space between the long chutes 642a and 642b and the water permeable sheets 671a and 671b to form the lower layer of cooling water. While the lower layer of cooling water flows downward, part of the lower layer of cooling water is leaked through the water permeable sheets 671a and 671b to form the upper layer of cooling water on the upper surfaces of the water permeable sheets 671a and 671b and flow on the upper surfaces of the long chutes 642a and 642b. The water permeable sheets 671a and 671b makes the upper surfaces of the long chutes 642a and 642b hydrophilic, so that the upper layer of cooling water is evenly spread over the upper surfaces of the long chutes 642a and 642b. This prevents filaments 620 from being stuck and prevents poor formation of the three-dimensional net-like structure 610 due to insufficient cooling, thus enabling a filament assembly 621 to be adequately cooled down and solidified and form the three-dimensional net-like structure 610. The cooling water is leaked from the lower surfaces to the upper surfaces of the water permeable sheets 671a and 671b and is spread as the upper layer of cooling water (FIG. 19a). This forms the uniform upper layer of cooling water. These features of embodiment 6 have greater effects on saving of cooling water and formation of a thick surface layer 625 described in embodiment 5.

Both embodiment 5 and embodiment 6 described above advantageously prevent formation of wrinkles in the three-dimensional net-like structure and reduce the required amount of water, thus enhancing the adhesion strength of the loops in the three-dimensional net-like structure, compared with the application with no fixation of the lower ends of the water permeable sheets.

A manufacturing apparatus 701 of three-dimensional net-like structure according to embodiment 7 of the invention is described below with reference to FIG. 20. The respective components are shown by the like numerals to those of embodiment 1 in the 700s, and the like components to those of embodiment 1 are not specifically explained here.

Figure 20:
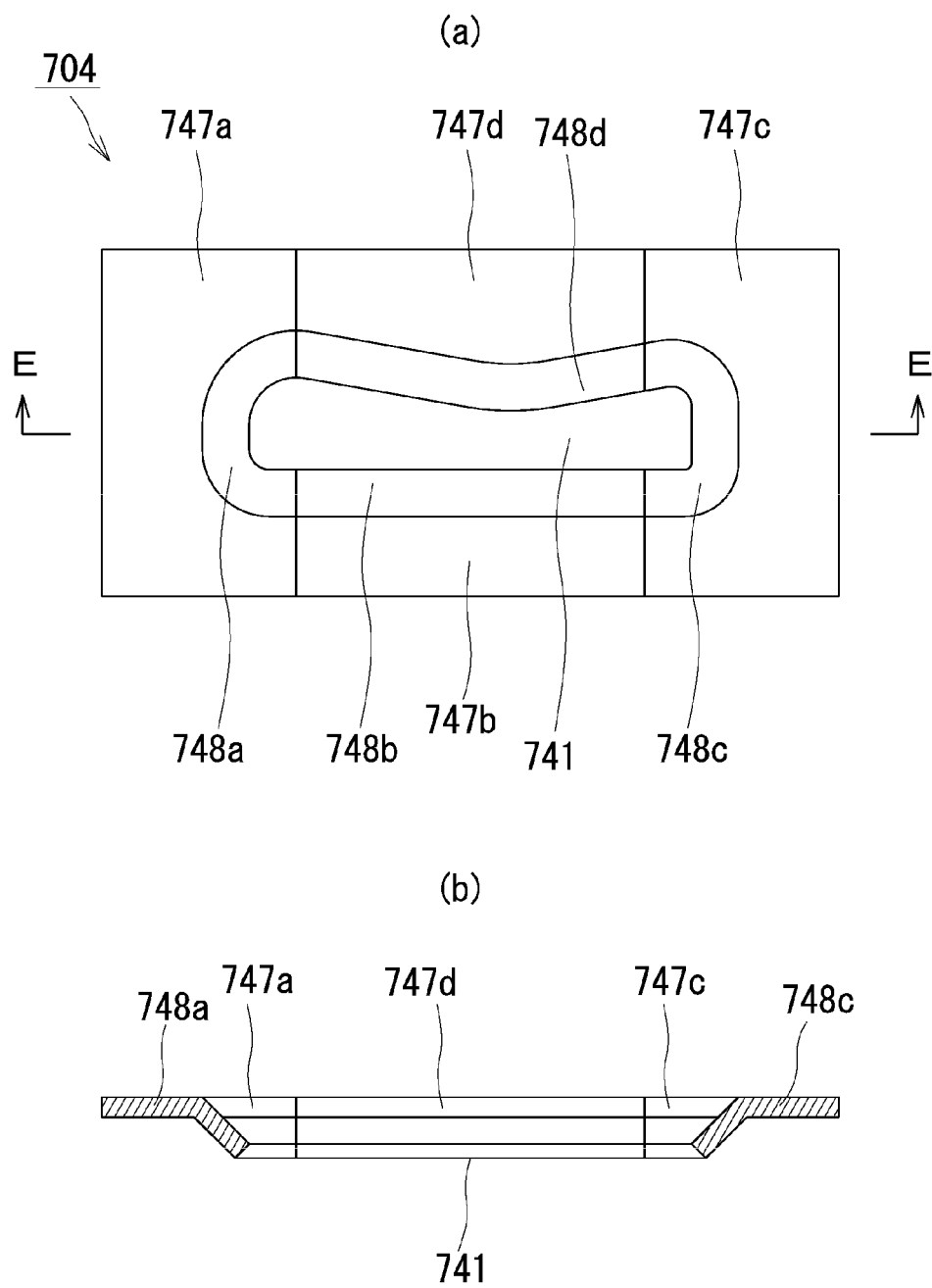

As shown in FIG. 20, in a manufacturing apparatus 701 of three-dimensional net-like structure, a chute 704 has split chutes 747a, 747b, 747c and 747d, which respectively have split inclined surfaces 748a, 748b, 748c and 748d. The chute 704 is assembled from the curved split chutes 747a, 747c and 747d and the linear split chute 747b, which form a continuous surface. Cooling water may additionally be supplied in the short direction, but it is generally sufficient to supply the cooling water in the longitudinal direction, i.e., the split chutes 747b and 747d and left and right adjacent areas to these split chutes.

The split-type structure of the chute 704 allows modification of the partial shape of the chute 704. This feature enables the three-dimensional net-like structure having any desired shape of cross section, in addition to the rectangular cross section, to be manufactured at low cost. For example, this feature is applicable to manufacture pillows, cushions, seat cushions, as well as bed mattresses and allows the change request of the product specification to be readily satisfied. This is, however, not restrictive and the chute 704 may alternatively be formed from one single plate.

Figure 21:
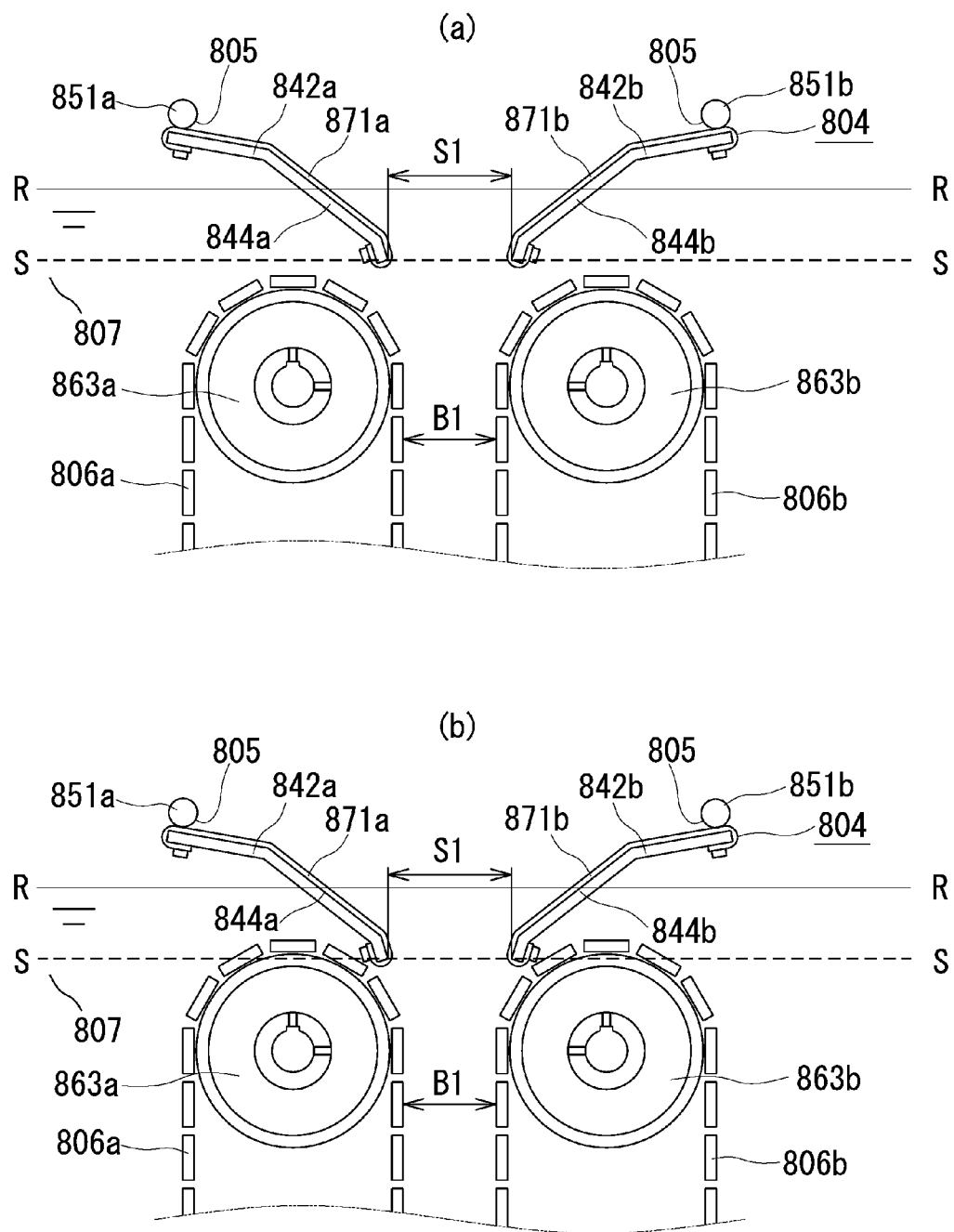
FIGS. 21a and 21b are diagrams showing changes in water level H by adjusting the installation height of a chute 804 according to another embodiment of the invention.

FIG. 21 illustrates a manufacturing apparatus 801 of three-dimensional net-like structure according to another embodiment. The respective components are shown by the like numerals to those of embodiment 1 in the 800s, and the like components to those of embodiment 1 are not specifically explained here. As shown in FIGS. 21a and 21b, the upper ends of haul-off machines 806 may be located above or below the water level R-S. The relationship between a distance B1 between the haul-off machines 806 and a distance S1 between chutes 844a and 844b is set as B1:S1=99 to 87:100 or preferably 98 to 90:100.

Figure 22:
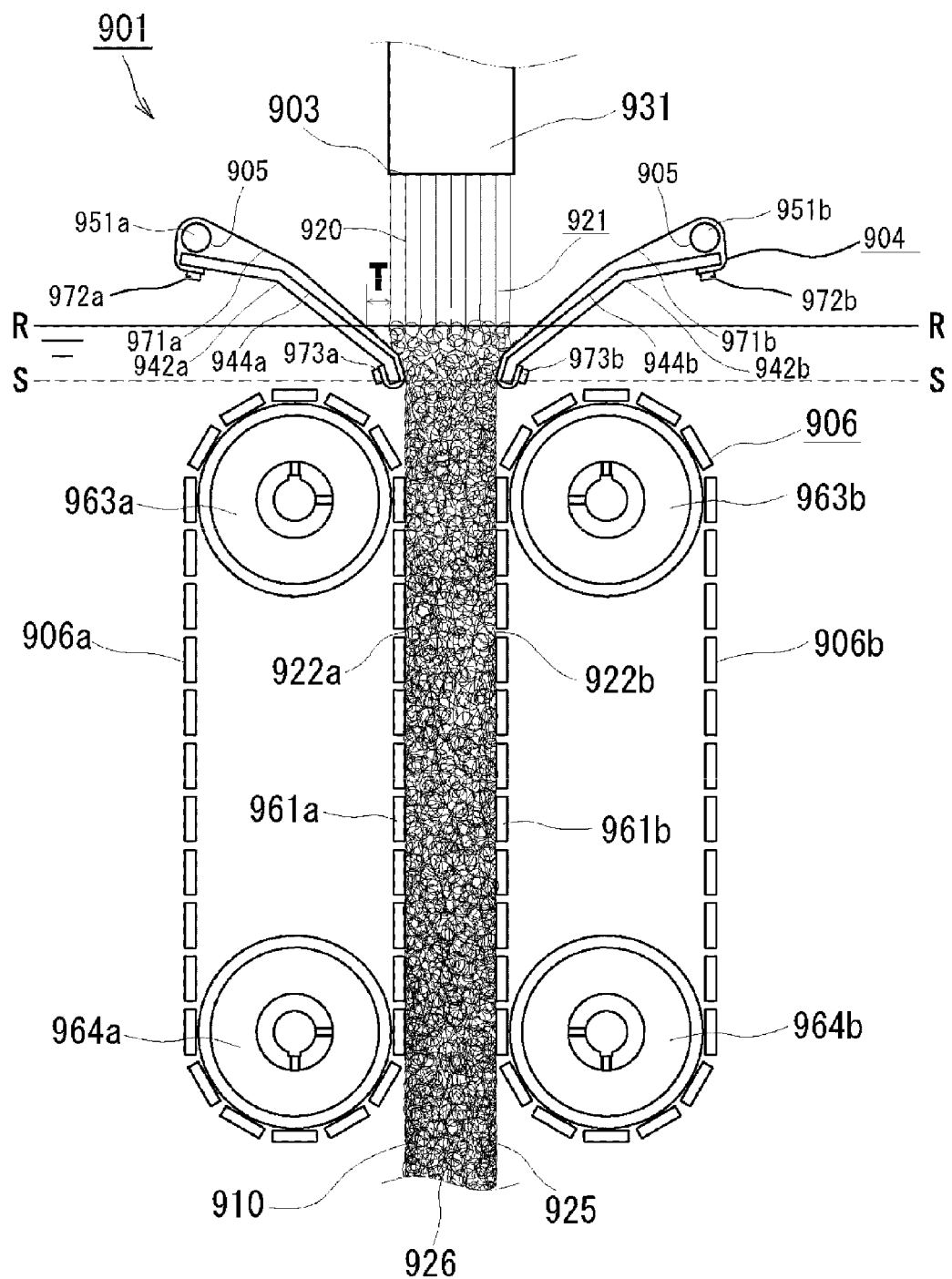
FIG. 22 is a diagram illustrating a manufacturing apparatus 901 of three-dimensional net-like structure according to another embodiment of the invention in use.

FIG. 22 illustrates a manufacturing apparatus 901 of three-dimensional net-like structure according to yet another embodiment. The respective components are shown by the like numerals to those of embodiment 1 in the 900s, and the like components to those of embodiment 1 are not specifically explained here. There is a predetermined interval T between a filament assembly 921 and the boundary formed between the water level R and water permeable sheets 971a and 971b. The filament assembly 921 comes into contact with the water permeable sheets 971a and 971b at the location below the water level R. The width of a nozzle 931 is not limited to the illustrated example but may be reduced.

The invention is not limited to the above embodiments but various modifications and variations may be made to the embodiments without departing from the scope of the invention. Such modifications and variations, as well as their equivalents are also included in the scope of the invention.

The invention claimed is:

1. A method for manufacturing a three-dimensional net-like structure, the three-dimensional net-like structure comprising a surface layer and an inside part, wherein the bulk density of the inside part is 0.045 to 0.085 g/cm$^3$ and the ratio of the bulk density of the surface layer of the three-dimensional net-like structure to the bulk density of the inside part of the three-dimensional net-like structure is 1.5:1 to 6:1, the method comprising the steps of:

(a) extruding and dropping downward a thermoplastic synthetic resin in a molten state from a nozzle having a plurality of extrusion holes arrayed in an approximately rectangular shape to form a filament assembly of a plurality of filaments;

(b) supplying cooling water onto upper surfaces of a pair of long chutes that are located below the nozzle, are arranged across longitudinal faces of the filament assembly, are inclined downward toward a center of the filament assembly, are opposed to each other across a distance that is 6 to 25% less than a short side length of the array of the extrusion holes at inclined lower ends of the pair of long chutes, and are submerged at the lower ends by 3 to 45 mm in water of an underlying water tank;

(c) causing filaments located on the longitudinal faces of the filament assembly to fall into contact with the upper surfaces of the long chutes which are not submerged in the tank water, so as to bend the filaments located on the longitudinal faces of the filament assembly in substantial loops, tangle adjacent filaments located on the longitudinal faces of the filament assembly at random, and make the filaments located on the longitudinal faces of the filament assembly thermally adhere to one another while falling toward the lower ends of the pair of long chutes;

(d) cooling down the plurality of tangled filaments with the cooling water supplied to the upper surfaces of the long chutes;

(e) forming the surface layer on the longitudinal faces of the filament assembly, while guiding the plurality of tangled filaments obliquely downward toward the center of the filament assembly along the long chutes; and (f) compressing and shape-forming the filament assembly by a pair of haul-off machines that are located below the long chutes and are opposed to each other across a distance that is 1 to 30% less than the distance between the pair of opposed long chutes so as to hold the longitudinal faces of the filament assembly therebetween, haul off the filament assembly at a lower haul-off speed than a fall speed of the filament assembly, and submerge the filament assembly into the tank water and cool down and solidify the submerged filament assembly.

2. The method of claim 1, wherein:

step (b) also supplies cooling water onto upper surfaces of a pair of short chutes that are located below the nozzle, are arranged across short-direction faces of the filament assembly, are inclined downward toward the center of the filament assembly, and are opposed to each other across a distance that is equal to or less than a long side length of the array of the extrusion holes at inclined lower ends of the pair of short chutes, step (c) causes filaments located on the short-direction faces of the filament assembly to be in contact with upper surfaces of the short chutes, so as to bend the filaments located on the short-direction faces of the filament assembly in substantial loops, tangle the adjacent filaments located on the short-direction faces of the filament assembly at random, and make the filaments located on the short-direction faces of the filament assembly thermally adhere to one another, step (d) cools down the plurality of tangled filaments located on the short-direction faces with the cooling water supplied to the upper surfaces of the short chutes, and step (e) also forms the surface layer on the short-direction faces of the filament assembly, while guiding the plurality of tangled filaments located on the short-direction faces obliquely downward toward the center of the filament assembly along the short chutes.

3. The method of claim 2, wherein step (a) forms harder side portions of higher bulk filament density than bulk filament density of other portions thereof, the harder side portions being formed at locations corresponding to the short-direction faces of the filament assembly by increasing supply of the filaments from part of the nozzle corresponding to the short-direction faces of the filament assembly to be more than supply of the filaments from a remaining part of the nozzle or by setting the long side length of the array of the extrusion holes to be greater than the distance between the short chutes.

4. The method of claim 1, wherein step (f) temporarily decreases a haul-off speed of the haul-off machines with respect to an ordinary haul-off speed to thereby form a harder center portion of higher bulk density in a haul-off direction in the three-dimensional net-like structure than bulk density of other portions formed at the ordinary haul-off speed.

* * * * *